(12) United States Patent
Yacoby

(10) Patent No.: US 11,902,666 B2
(45) Date of Patent: Feb. 13, 2024

(54) SYSTEMS AND METHODS OF IMAGE ACQUISITION

(71) Applicant: ISRAEL AEROSPACE INDUSTRIES LTD., Lod (IL)

(72) Inventor: Erez Yacoby, Nof Aylon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 166 days.

(21) Appl. No.: 17/775,450

(22) PCT Filed: Sep. 30, 2020

(86) PCT No.: PCT/IL2020/051064
§ 371 (c)(1),
(2) Date: May 9, 2022

(87) PCT Pub. No.: WO2021/095028
PCT Pub. Date: May 20, 2021

(65) Prior Publication Data
US 2022/0385824 A1    Dec. 1, 2022

(30) Foreign Application Priority Data
Nov. 11, 2019   (IL) .......................................... 270565

(51) Int. Cl.
*H04N 23/695* (2023.01)
*H04N 23/66* (2023.01)

(52) U.S. Cl.
CPC ........... *H04N 23/695* (2023.01); *H04N 23/66* (2023.01)

(58) Field of Classification Search
CPC .............................. H04N 23/695; H04N 23/66
See application file for complete search history.

(56) References Cited

U.S. PATENT DOCUMENTS 6,400,402 B1   6/2002  Iwanaga
7,417,210 B2   8/2008  Ax, Jr. et al.
(Continued)

FOREIGN PATENT DOCUMENTS

CN    106017675 A   10/2016
EP      3270581 A1    1/2018
WO     03102505 A1   12/2003

OTHER PUBLICATIONS

PCT International Search Report for International Application No. PCT/IL2020/051064, dated Nov. 17, 2020, 4pp.
(Continued)

*Primary Examiner* — Sunghyoun Park
(74) *Attorney, Agent, or Firm* — The Roy Gross Law Firm, LLC; Roy Gross

(57) ABSTRACT

An imaging method which comprises, while a line of sight of a camera is maintained fixedly oriented towards a target, controlling the camera to acquire an image by a sensor located at a current position relative to the camera, sending a command to an actuator of the sensor, for inducing a motion of the sensor relative to the camera along at least one direction, from the current position to a new position, controlling the camera to acquire an image by each of the pixel bands of the sensor, wherein motion of the sensor is performed during a first period of time, and the sensor is retained stationary at the new position during a second period of time, wherein acquisition of the image is performed during a third period of time, wherein a majority of the third period of time is within the second period of time.

20 Claims, 20 Drawing Sheets

(56) References Cited

U.S. PATENT DOCUMENTS

| | | |
|---|---|---|
| 9,442,012 B2 | 9/2016 | Mann et al. |
| 2004/0105010 A1* | 6/2004 | Osen .................. G01S 5/16 |
| | | 348/E7.086 |
| 2005/0177307 A1 | 8/2005 | Greenfield et al. |
| 2008/0001066 A1 | 1/2008 | Ax et al. |
| 2010/0277587 A1 | 11/2010 | Pechatnikov et al. |
| 2018/0046062 A1* | 2/2018 | Fisher .................. H04N 23/62 |
| 2018/0220107 A1 | 8/2018 | Williams, Jr. |
| 2018/0332232 A1 | 11/2018 | Horak |

OTHER PUBLICATIONS

PCT Written Opinion for International Application No. PCT/IL2020/051064, dated Nov. 17, 2020, 4pp.

* cited by examiner

SYSTEMS AND METHODS OF IMAGE ACQUISITION

This application is a National Phase of PCT Patent Application No. PCT/IL2020/051064 having International filing date of Sep. 30, 2020, which claims the benefit of priority of Israeli Patent Application No. 270565, filed Nov. 11, 2019, the contents of which are all incorporated herein by reference in their entirety.

TECHNICAL FIELD

The presently disclosed subject matter relates to image acquisition from a scanning vehicle such as an airborne, a satellite, or from an imager which can be located on ground.

BACKGROUND

In the push-broom solution, a linear array detector is arranged perpendicular to the flight direction of a satellite. The linear array detector advances with the satellite's motion, producing successive lines of image data.

In this solution, a smearing effect can alter quality of the images. In addition, this solution generally requires TDI (Time Delay and Integration) detectors which are expensive.

GENERAL DESCRIPTION

In accordance with certain aspects of the presently disclosed subject matter, there is provided an imaging system comprising at least one camera, comprising at least one sensor comprising one or more pixel bands each configured to acquire an image of a fraction of a scene, wherein the sensor is movable, by at least one actuator, relative to the camera along at least one direction, a processing unit and associated memory configured to, while a line of sight of the camera is maintained fixedly oriented towards a target of a scene: ($O_1$) control the camera to acquire an image by each of the pixel bands of the sensor located at a current position relative to the camera, ($O_2$) send a command to the actuator to move the sensor relative to the camera along the at least one direction, from the current position to a new position, and ($O_3$) control the camera to acquire an image by each of the pixel bands of the sensor, wherein motion of the sensor at $O_2$ from the current position to the new position is performed during a period of time $PT_1$, and the sensor is retained stationary at the new position during a period of time $PT_2$, wherein acquisition of the image by each of the pixel bands of the sensor at $O_3$ is performed during period of time $PT_3$, wherein at least a majority of the period of time $PT_3$ is within the period of time $PT_2$.

In addition to the above features, the imaging system according to this aspect of the presently disclosed subject matter can optionally comprise one or more of features (i) to (x) below, in any technically possible combination or permutation:

i. the system is configured to be mounted on an airborne or a satellite, wherein the line of sight of the camera is maintained fixedly oriented towards the target of the scene during motion of the airborne or satellite;
  ii. the system is configured to be part of a ground imager;
  iii. all of the period of time $PT_3$ is within the period of time $PT_2$;
  iv. the processing unit is configured to repeat ($O_2$) and ($O_3$) a plurality of times, until acquisition of at least part of the scene, or of the whole scene, by each of the pixel bands, is obtained;
  v. the processing unit and associated memory are configured to, for a plurality of different scenes $SC_1$ to $SC_N$, with N>1, repetitively perform, from i equal to 1 up to i equal to N: ($O_{0,i}$) while a line of sight of the camera is maintained fixedly oriented towards a target of a scene $SC_i$: ($O_{1,i}$) control the camera to acquire, by each of one or more pixel bands of the sensor located at a current position relative to the camera, an image of a fraction of scene $SC_i$, ($O_{2,i}$) send a command to the actuator to move the sensor relative to the camera along the at least one direction, from the current position to a new position, and ($O_{3,i}$) control the camera to acquire, by each of one or more pixel bands of the sensor located at the new position relative to the camera, an image of a fraction of at least scene $SC_i$, wherein motion of the sensor at $O_{2,i}$ from the current position to the new position is performed during a first period of time $PT_{1,i}$, and the sensor is retained stationary at the new position during a second period of time $PT_{2,i}$, wherein acquisition of the image at $O_{3,i}$ is performed during a third period of time $PT_{3,i}$, wherein at least a majority of the third period of time $PT_{3,i}$ is within the second period of time $PT_2$, ($O_{3,i}$) revert to operation $O_{2,i}$, wherein, after a period of time, i is incremented by one and it is reverted to operation $O_{0,i}$;
  vi. an orientation of the line of sight toward a target of scene $SC_i$ is changeable to an orientation toward a target of scene $SC_{i+1}$ by performing a manoeuvre of a vehicle on which the imaging system is mounted;
  vii. each of the pixel bands is configured to acquire images in a different spectral range; and the camera is controlled so that each pixel band of the camera gradually acquires an image of each of a plurality of the scenes $SC_i$ as a whole in its spectral range, thereby providing an image of each of the plurality of the scenes $SC_i$ in its spectral range;
  viii. the sensor is a two dimensional sensor comprising a plurality of pixel bands;
  ix. while a line of sight of the camera is maintained fixedly oriented towards a target of a scene, a direction of motion of the sensor from the current position to the new position is not opposite to a direction of motion of a vehicle on which the imaging system is mounted; and
  x. the sensor comprises a plurality of pixel bands having a similar width, wherein the processing unit is configured to induce motion of the sensor relative to the camera along a distance substantially equal to the width, or smaller than the width.

According to another aspect of the presently disclosed subject matter there is provided an imaging method comprising: providing at least one camera, wherein the camera comprises at least one sensor comprising one or more pixel bands each configured to acquire an image of a fraction of a scene, while a line of sight of the camera is maintained fixedly oriented towards a target of a scene:($O_1$) controlling the camera to acquire an image by each of the pixel bands of the sensor located at a current position relative to the camera, ($O_2$) sending a command to an actuator of the sensor, for inducing a motion of the sensor relative to the camera along at least one direction, from a current position to a new position, ($O_3$) controlling the camera to acquire an image by each of the pixel bands of the sensor, wherein motion of the sensor from the current position to the new position is performed during a first period of time $PT_1$, and the sensor is retained stationary at the new position during a second period of time $PT_2$, wherein acquisition of the image by each of the pixel bands of the sensor is performed during a third period of time $PT_3$, wherein at least a majority of the third period of time $PT_3$ is within the second period of time $PT_2$.

In addition to the above features, the method according to this aspect of the presently disclosed subject matter can optionally comprise one or more of features (xi) to (xx) below, in any technically possible combination or permutation:
  xi. the camera is mounted on an airborne or a satellite, wherein the line of sight of the camera is maintained fixedly oriented towards the target of the scene during motion of the airborne or satellite;
  xii. the camera is part of a scanning imager including a basement which orientation is controllable to modify an orientation of the line of sight of the camera;
  xiii. all of the third period of time $PT_3$ is within the second period of time $PT_2$;
  xiv. the method comprises repeating ($O_2$) and ($O_3$) a plurality of times, until acquisition of at least part of the scene, or of the whole scene, by each of the pixel bands, is obtained;
  xv. the method comprises, for a plurality of different scenes $SC_1$ to $SC_N$, with N>1, repetitively performing, from i equal to 1 up to i equal to N: ($O_{0,i}$) while a line of sight of the camera is maintained fixedly oriented towards a scene $SC_i$: ($O_{1,i}$) controlling the camera to acquire, by each of one or more pixel bands of the sensor located at a current position relative to the camera, an image of a fraction of scene $SC_i$, ($O_{2,i}$) sending a command to the actuator to move the sensor relative to the camera along the at least one direction, from the current position to a new position, and ($O_{3,i}$) controlling the camera to acquire, by each of one or more pixel bands of the sensor located at the new position relative to the camera, an image of a fraction of at least scene $SC_i$, wherein motion of the sensor at $O_{2,i}$ from the current position to the new position is performed during a first period of time $PT_{1,i}$, and the sensor is retained stationary at the new position during a second period of time $PT_{2,i}$, wherein acquisition of the image at $O_{3,i}$ is performed during a third period of time $PT_{3,i}$, wherein at least a majority of the third period of time $PT_{3,i}$ is within the second period of time $PT_{2,i}$, ($O_{3,i}$) reverting to operation $O_{2,i}$, wherein, after a period of time, i is incremented by one and it is reverted to operation $O_{0,i}$;
  xvi. the method comprises changing orientation of the line of sight toward a target of scene $SC_i$ to an orientation toward a target of scene $SC_{i+1}$ by performing a manoeuvre of a vehicle on which the camera is mounted;
  xvii. each of the pixel bands is configured to acquire images in a different spectral range and the camera is controlled so that each pixel band of the camera gradually acquires an image of each of a plurality of the scenes $SC_i$ as a whole in its spectral range, thereby providing an image of each of the plurality of the scenes $SC_i$ in its spectral range;
  xviii. the sensor is a two dimensional sensor comprising a plurality of pixel bands;
  xix. while a line of sight of the camera is maintained fixedly oriented towards a target of a scene, a direction of motion of the sensor from the current position to the new position is not opposite to a direction of motion of a vehicle on which the camera is mounted;
  xx. the sensor comprises a plurality of pixel bands having a similar width, wherein the method comprises moving the sensor relative to the camera along a distance substantially equal to the width, or smaller than the width.

According to another aspect of the presently disclosed subject matter there is provided a non-transitory computer readable medium comprising instructions that, when executed by a processing unit and associated memory, cause the processing unit and associated memory to perform operations comprising: while a line of sight of a camera is maintained fixedly oriented towards a target of a scene, wherein the camera comprises at least one sensor comprising one or more pixel bands, ($O_1$) controlling the camera to acquire an image by each of the pixel bands of the sensor located at a current position relative to the camera, ($O_2$) sending a command to an actuator of the sensor, for inducing a motion of the sensor relative to the camera along at least one direction, from a current position to a new position, ($O_3$) controlling the camera to acquire an image by each of the pixel bands of the sensor, wherein motion of the sensor from the current position to the new position is performed during a first period of time $PT_1$, and the sensor is retained stationary at the new position during a second period of time $PT_2$, wherein acquisition of the image by each of the pixel bands of the sensor is performed during a third period of time $PT_3$, wherein at least a majority of the third period of time $PT_3$ is within the second period of time $PT_2$.

In addition to the above features, the non-transitory computer readable medium comprises instructions that, when executed by a processing unit and associated memory, cause the processing unit and associated memory to perform operations according to any one or more of features (x) to (xx) above.

According to some embodiments, the proposed solution provides a simple and cost effective solution to acquire images.

According to some embodiments, the proposed solution provides acquisition of a panchromatic image of a scene with a two dimensional sensor which can be both of large dimensions and cost effective.

According to some embodiments, the proposed solution provides acquisition of a scene in different spectral bands, in a simple and efficient way, which does not require cumbersome post-processing.

According to some embodiments, the proposed solution provides acquisition of a scene in a way which reduces smearing effect which can be caused by motion of a scanning vehicle such as an airborne or a satellite.

According to some embodiments, the proposed solution provides acquisition of an image of a scene with a better quality than other prior art methods.

According to some embodiments, the proposed solution provides acquisition of an image of a scene without requiring transmission of high volume of data between an airborne (or a satellite) and a ground station.

According to some embodiments, the proposed solution provides acquisition of a scene with an integration time which is higher relative to some prior art solutions, thereby avoiding use of complicated and costly sensors such as TDI (time delay integration) sensors.

In particular, according to some embodiments, the proposed solution allows acquisition of the image while the airborne or satellite is staring at the scene to be acquired, thereby improving signal to noise ratio.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "sending", "controlling", "acquiring", or the like, refer to the action(s) and/or process(es) of a processing unit that manipulate and/or transform data into other data, said data represented as physical, such as electronic, quantities and/or said data representing the physical objects.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

The processing unit can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

Figure 1:
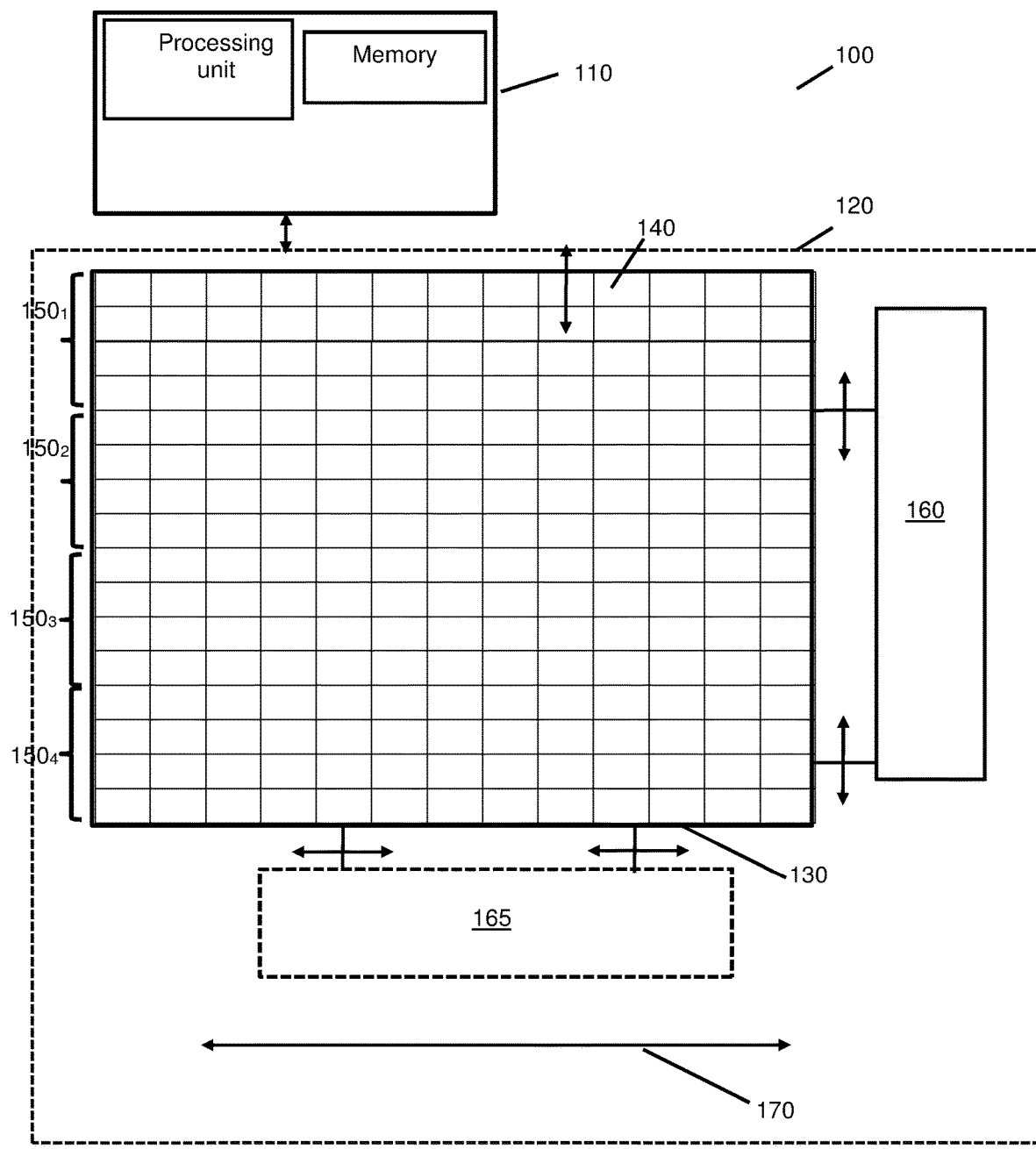
FIG. 1 illustrates an embodiment of a system which can be used to perform one or more of the methods described hereinafter.

FIG. 1 illustrates an embodiment of a system 100 which can be used for acquiring images of a scene.

System 100 can be mounted or affixed to a scanning vehicle such as an airborne (e.g. plane, drone, etc.), or a satellite.

In some embodiments, system 100 can be mounted on a terrestrial scanning vehicle, such as a car.

In some embodiments, system 100 can be part of an imager, which can be located on ground.

In some embodiments, the imager (device for acquiring images using the camera of system 100) can be located on a basement (such as a tripod). Orientation of the basement can be modified to change the orientation of the line of sight of a camera of the imager, thereby allowing acquisition of images of different scenes.

In other embodiments, the imager can be handled by a user who can manually change line of sight of the camera by changing orientation of the imager.

As shown, system 100 comprises at least one camera 120. Camera 120 comprises at least one sensor 130 (imaging sensor, also called photon detector) comprising a plurality of pixels. Photons reflected or transmitted by a scene to be observed are collected by an optics 170 of camera 120 and are sensed by sensor 130. Camera 120 can comprise various other elements (electric elements, optical elements) which are not described since they are part of a regular camera.

According to some embodiments, and as shown in FIG. 1, sensor 130 comprises a plurality of pixels 140.

According to some embodiments, and as shown in FIG. 1, sensor 130 is a two dimensional sensor which can comprise a plurality of pixel bands (or pixel stripes—see reference $150_1, 150_2, \ldots, 150_4$). In FIG. 1, four pixel bands are depicted. This number is not limitative and other numbers can be used.

According to some embodiments, the different pixel bands are part of a common two-dimensional sensor. In particular, the different pixel bands can belong to the same physical pixel matrix.

According to other embodiments, each pixel band is physically distinct from the other pixel bands, and is not necessarily mechanically and/or electronically connected to the other pixel bands. However, the different pixel bands constitute together an assembly which can be viewed a two dimensional sensor.

Each pixel band comprises a plurality of pixel lines. According to some embodiments, and as explained hereinafter, each pixel band can be configured to detect light in a different spectral range. In order to obtain this multi-spectral detection, each pixel band can be associated with a different optical filter. In particular, each optical filter can be configured to transmit light in a different spectral range.

Each optical filter can be affixed e.g. to the surface of a corresponding pixel band, or can be located in the vicinity of a corresponding pixel band. According to some embodiments, the optical filters can be affixed directly to the die (which includes the pixels), or on the sensor windows (several millimeters above the die).

As shown in FIG. 1, sensor 130 can be associated with at least one actuator 160. Actuator 160 can be part of camera 120 (e.g. it can be located within camera 120). Actuator 160 is configured to move sensor 130. According to some embodiments, actuator 160 is configured to move sensor 130 according to at least one direction (translation).

In particular, actuator 160 can move sensor 130 relative to the camera 120 itself, and therefore, relative to the airborne or satellite on which the camera 120 is affixed. In other words, in a referential associated with the camera (or in some embodiments in a referential associated with the airborne or the satellite), the sensor 130 is movable along at least one direction.

In some embodiments, actuator 160 moves the whole sensor 130, and therefore, each of the pixel band of sensor 130 is moved accordingly.

According to some embodiments, an actuator can move sensor 130 along more than one direction. For this purpose, at least two different actuators can be used (one per direction, see reference 160 and 165). According to some embodiments, a single actuator with at least two degrees of freedom can be used, thereby allowing motion of the sensor according to two directions.

Examples of actuator can include e.g. piezo-electric actuators, acoustic actuator, electric actuators, pneumatic actuators, hydraulic actuators, etc.

As shown in FIG. 1, system 100 can comprise a processing unit and a memory (e.g. non-transitory memory), represented by reference 110 in FIG. 1.

In some embodiments, the processing unit and memory are not part of system 100 but are operatively connected with system 100.

The processing unit can in particular send commands to the camera 120, in order to control acquisition of images by sensor 130, and can also send commands (directly, and/or through the camera) to the actuator 160 for controlling motion of sensor 130.

According to other embodiments (see FIG. 1A), sensor 130 can comprise a single pixel band 150$_5$ comprising a plurality of pixel lines. In this case, sensor 130 generally operates in a single spectral range.

Figure 1A:
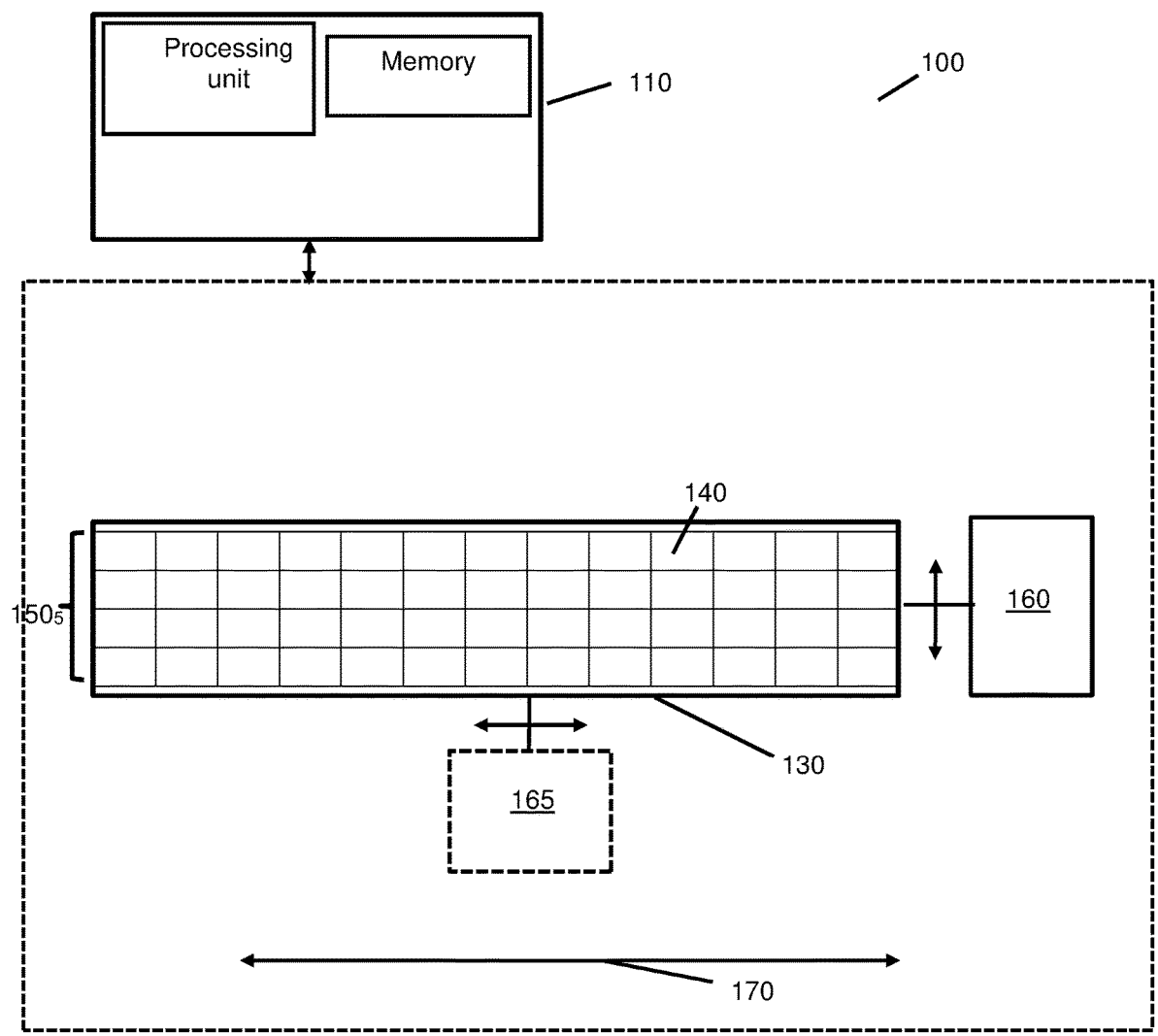
FIG. 1A illustrates another embodiment of a system which can be used to perform one or more of the methods described hereinafter.
Figure 1B:
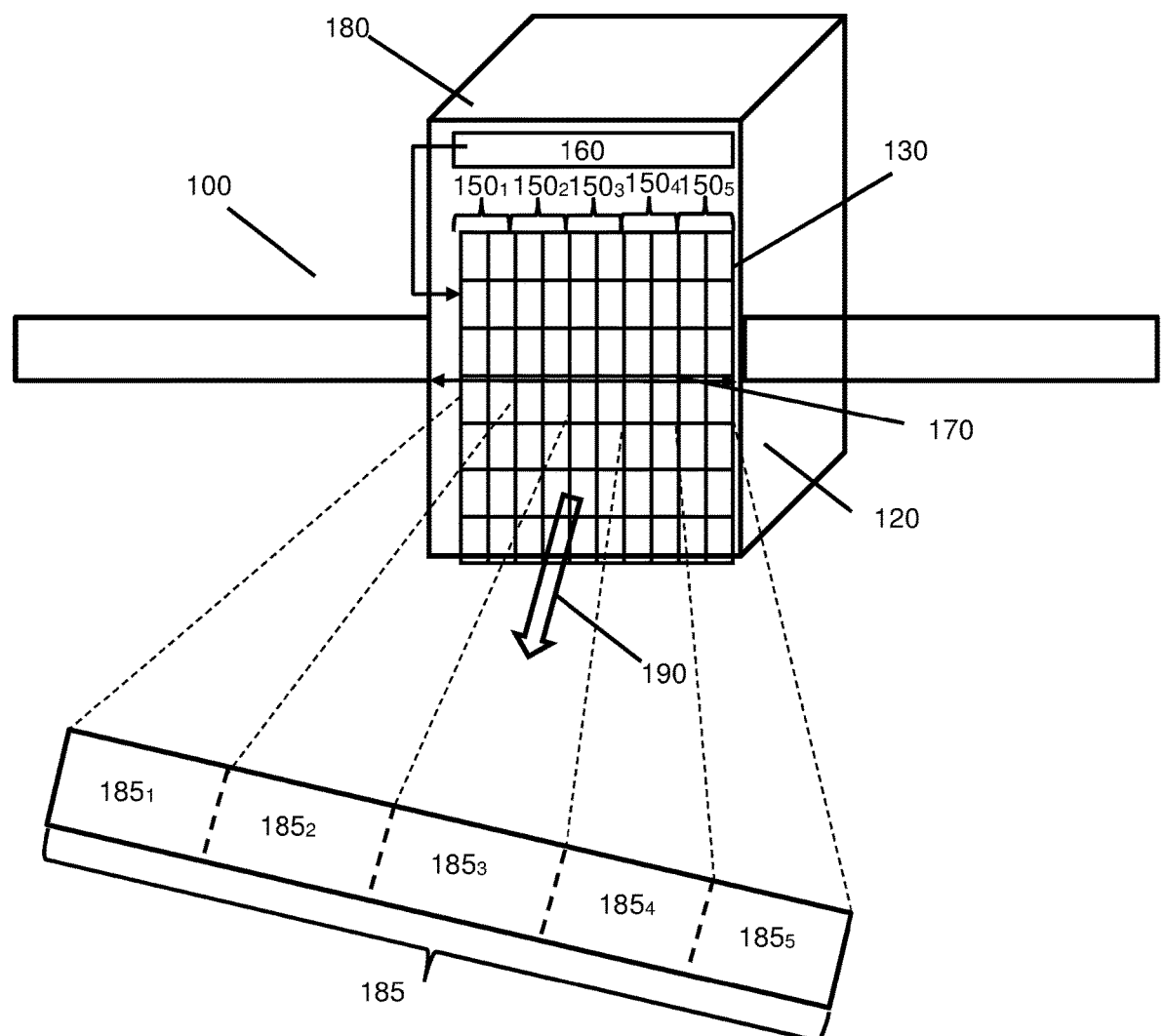
FIG. 1B illustrates the system of FIG. 1 mounted e.g. on an airborne or satellite in order to acquire images of a scene.

Attention is now drawn to FIG. 1B.

Assume system 100 is mounted on a satellite 180 (this example is not limitative, and as already explained above, system 100 can be also mounted on other platforms). Assume image of a scene 185 has to be captured by the camera 120 comprising sensor 130 and optics 170, which collects light and directs it towards sensor 130. As shown in FIG. 1B, satellite 180, which is in orbital motion around Earth, is currently oriented towards the scene 185.

According to some embodiments, a line of sight 190 of the camera 120 is maintained (substantially) fixedly oriented towards a target of the scene 185 which is covered by the camera field of view (the target is generally fixed relative to the scene) on Earth, although the satellite is in constant orbital motion around Earth. The line of sight 190 can be defined e.g. as the central line of the optical field of view (FOV) of the camera which is oriented toward the scene. As explained above, the sensor 130 is movable relative to the camera. Field of view of the sensor 130 is generally smaller than field of view of the camera 120, and the sensor 130 is moved such as its field of view remains located within the larger field of view of the camera.

Figure 1C:
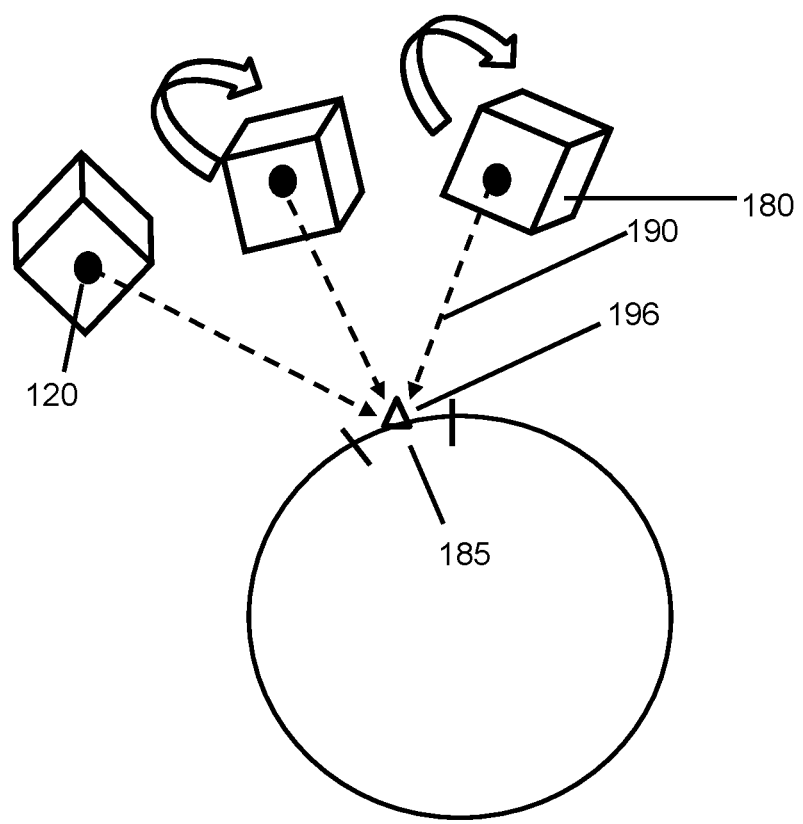
FIG. 1C illustrates a method of maintaining line of sight of a camera of e.g. an airborne or satellite towards a fixed target of a scene, while the airborne or satellite is moving.

As shown in FIG. 1C, the line of sight 190 of the camera 120 of the satellite 180 is maintained oriented towards a (fixed) target 196 of the scene 185, by modifying the direction and/or orientation (also called attitude) of the satellite 180 during its orbital motion around Earth.

Although the line of sight 190 is always pointing during this period of time towards the same target 196, its inclination relative to Earth evolves over time, as a consequence of the satellite 180 motion and orbiting over time.

According to some embodiments, control moment gyroscopes (CMG) embedded on the satellite 180 can be used to modify direction and/or orientation of the satellite 180 and therefore to maintain a fixed line of sight of the camera 120.

In some examples, this relative static position of the satellite 180 relative to the scene 185 can be maintained during a period of time of several tens of seconds (this is however not limitative).

The same principles can be used in some embodiments for an airborne (e.g. drone).

In some embodiments, the line of sight of the camera is maintained fixedly oriented towards a target of the scene by modifying orientation and/or direction of a basement on which the camera of system 100 is mounted. For example, one or more gimbals can be used to modify orientation of the basement, and as a consequence, to modify orientation of the line of sight of the camera.

According to some embodiments, this solution can be used when system 100 is located on a scanning vehicle (e.g. plane, drone, car, etc.—this could be used even for a satellite), and therefore, during motion of the scanning vehicle, line of sight of the camera is maintained fixedly oriented towards a target of the scene by using gimbals modifying orientation of the basement (instead of modifying orientation of the scanning vehicle).

In some embodiments, a double motion can be used to maintain fixed line of sight of the camera: a modification of the orientation of the scanning vehicle itself is performed during its motion (as explained above with reference to FIG. 1C), in combination with a modification of the orientation of the basement on which system 100 is located (using e.g. gimbals as explained above).

As already mentioned above, system 100 is not necessarily mounted on a scanning vehicle and can be part, in some embodiments, of an imager located e.g. on ground. The imager can be mounted on a basement located on ground. Orientation of the basement on which the camera of system 100 is located can be modified over time (using e.g. a tripod as basement, which can be e.g. rotated). During a first period of time, the basement is oriented so that the line of sight of the camera is oriented towards a fixed target of a first scene, during a second period of time, the basement is rotated to orient the light of sight towards fixed target of a second scene, etc. Therefore, it is possible to obtain a fixed line of sight of the camera towards a fixed target of a different scene for each period of time.

If the imager is handled by a user, the user can manually change the line of sight of the camera: during a first period of time, the user orients the line of sight of the camera towards a first scene, during a second period of time, the user orients the line of sight of the camera towards a second scene, etc.

As visible in FIG. 1B, sensor 130 comprises a plurality of pixel bands 150$_1$, . . . , 150$_5$. As shown, when the line of sight 190 of the camera 120 is fixed towards a target of the scene, and actuator 160 does not move sensor 130, each pixel band acquires only a fraction of the scene (each pixel band acquires a different fraction of the scene—in some embodiments, the different fractions can partially overlap). In the example of FIG. 1B, each pixel band 150$_i$ acquires only fraction 185$_i$ of the scene 185, for i from 1 to 5.

Figure 1D:
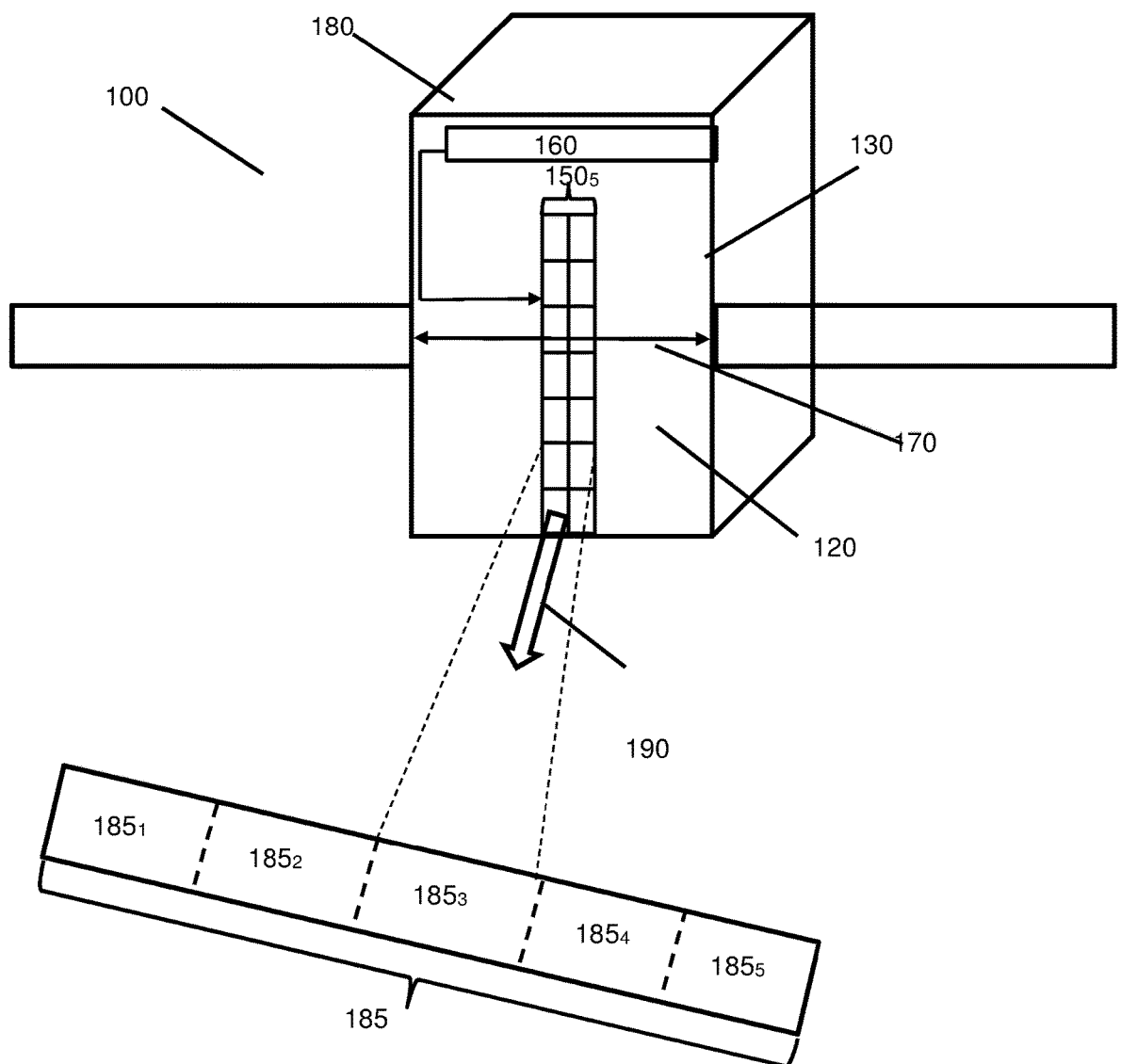
FIG. 1D illustrates the system of FIG. 1A mounted e.g. on an airborne or satellite in order to acquire images of a scene.

The same applies when sensor 130 comprises a single pixel band 150$_5$ (as depicted in FIG. 1A). This is shown in FIG. 1D, in which pixel band 150$_5$ acquires only a fraction 185$_3$ of the scene 185 to be captured by the camera 120.

Figure 2:
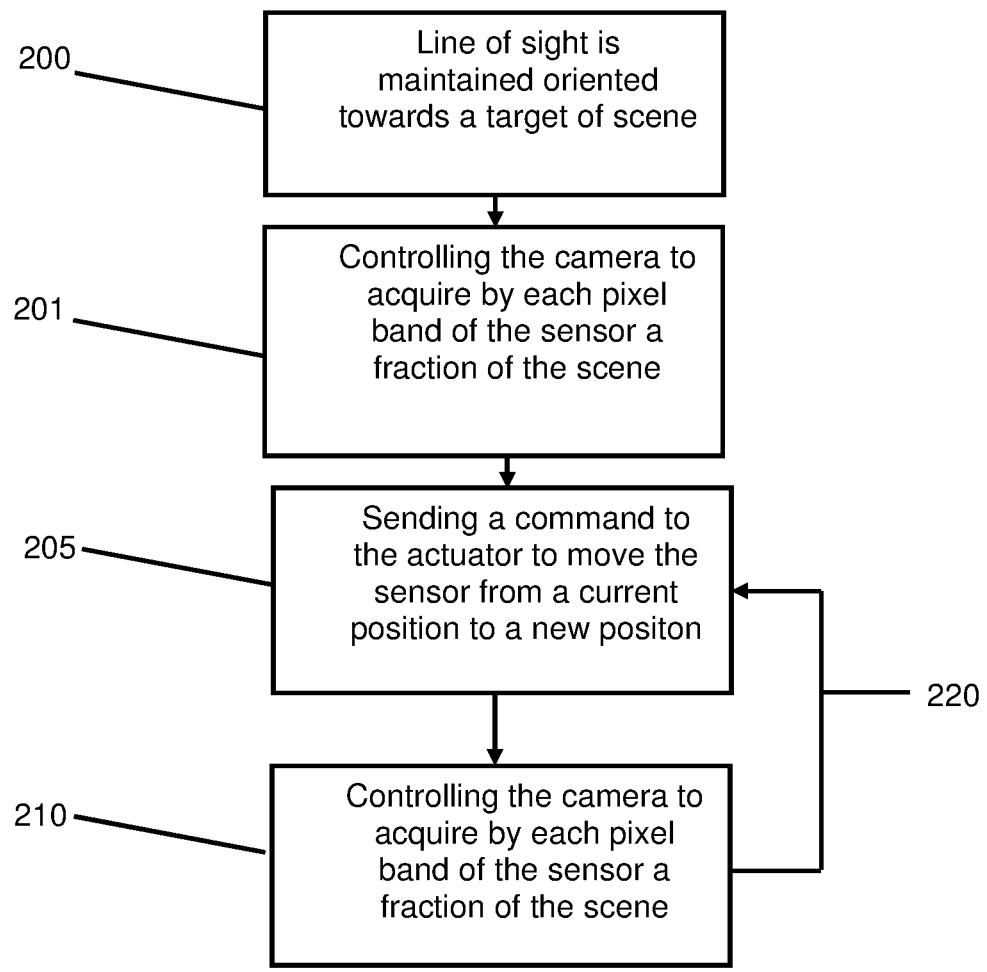
FIG. 2 illustrates a method allowing acquisition of at least part of a scene, using the system of FIG. 1 or FIG. 1A.

Attention is now drawn to FIG. 2, which describes a method allowing acquisition of at least one scene, using system 100. As mentioned above, system 100 can be mounted on a scanning vehicle such as an airborne, a satellite, etc., or system 100 can be part of an imager located e.g. on ground.

Assume that line of sight of the camera 120 is maintained (see reference 200) fixedly oriented towards a fixed target of a scene (using at least one of the various methods described explained above).

Assume the sensor 130 is located at a current position with respect to the camera 120. In this current position of the sensor 130 relative to the camera 120, each pixel band of the sensor 130 acquires a fraction of the scene (operation 201).

The method can comprise sending (operation 205) a command (e.g. by the processing unit and memory 110) to the actuator 160 of the sensor 130, for inducing a motion of the sensor 130 relative to the camera 120 along at least one direction. The command can be sent to the actuator 160 itself, or to the camera 120 which transmits the command to the actuator 160.

The sensor 130 moves, as a consequence of the action of the actuator, from its current position to a new position relative to the camera 120. As explained with reference to FIG. 3A (see period of time $PT_2$), the sensor 130 is retained stationary at its new position, in order to acquire a new image of the scene.

If the actuator 160 moves the sensor 130 according to one direction, then the motion is a translation of the sensor 130 from the current position to the new position.

The method can comprise controlling (operation 210) the camera 120 to acquire an image by each of the pixel bands of the sensor 130 located at the new position.

In particular, each pixel band can now acquire a different fraction of a scene, depending on its position relative to the scene.

The method can be repeated a plurality of times, as indicated by arrow 220 in FIG. 2.

In particular, the iterative process of:
(1) moving the sensor relative to the camera (operation 205),
(2) acquiring (operation 210) an image by the sensor when it has joined its new position and is retained stationary at its new position (sensor is static relative to the camera), and
(3) reverting to (1) (operation 220)
can be performed while a line of sight of the camera is maintained (substantially) fixedly oriented towards a target of a scene.

Figure 3A:
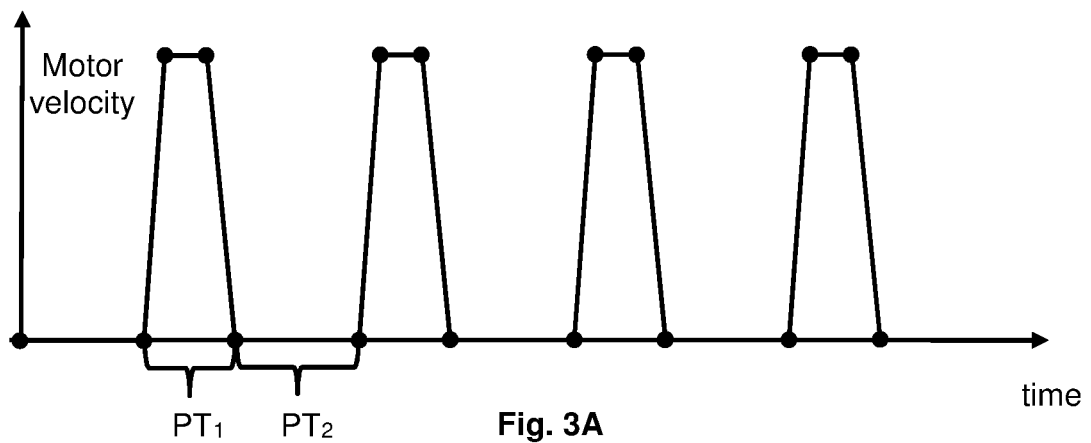
FIG. 3A illustrates velocity of a motor of an actuator configured to move a sensor in the system of FIG. 1 or FIG. 1A, with respect to time.
Figure 3B:
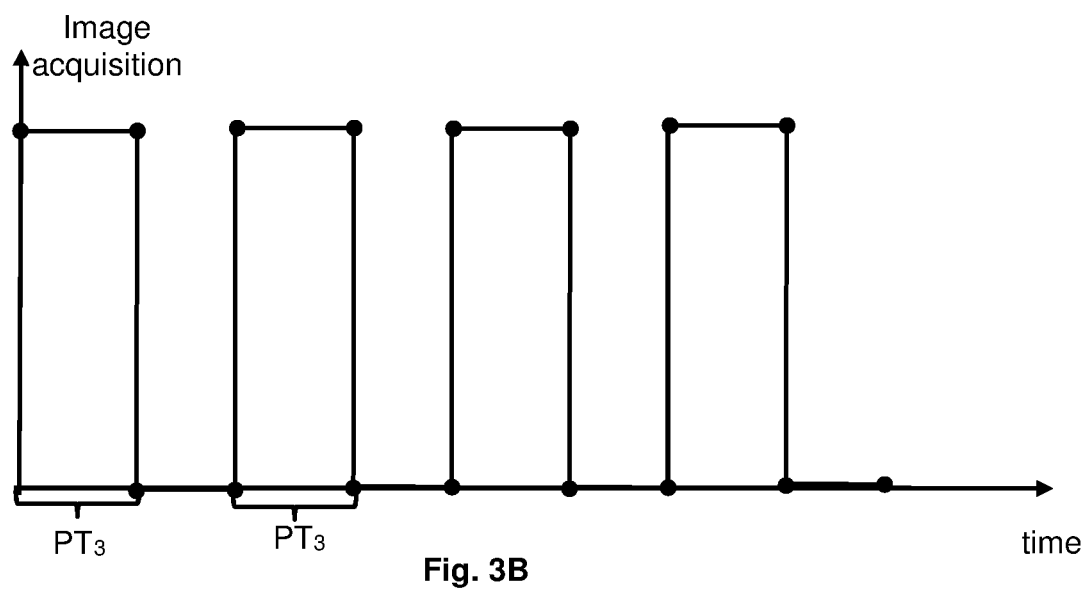
FIG. 3B illustrates a possible sequence of image acquisition by the camera in the system of FIG. 1 or FIG. 1A, with respect to time.
Figure 3C:
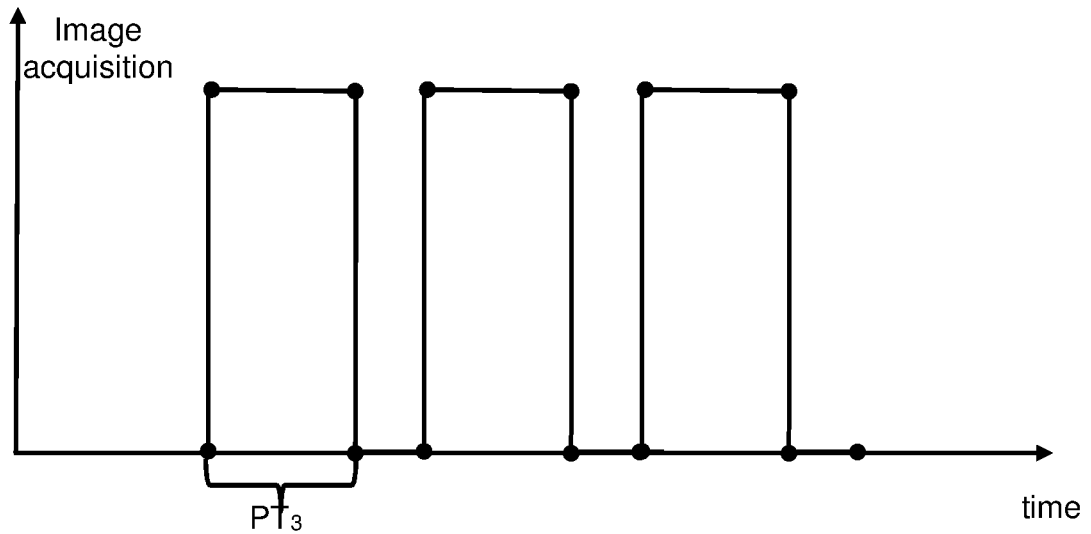
FIG. 3C illustrates another possible sequence of image acquisition by the camera in the system of FIG. 1 or FIG. 1A, with respect to time.

Attention is drawn to FIGS. 3A to 3C, which describe a temporal sequence of image acquisition in compliance with the method of FIG. 2.

FIG. 3A illustrates velocity of a motor of the actuator 160 with respect to time. As visible in FIG. 3A, the method comprises a first period of time $PT_1$ in which the actuator 160 is active and moves the sensor 130 from its current position to its new position (in compliance with reference 205 of FIG. 2).

The method comprises a second period of time $PT_2$ in which the sensor 130 is retained stationary (relative to the camera) at its new position (period of time $PT_2$ ends up when the actuator is again activated to further move the sensor 130 to another new position).

As shown in FIGS. 3B and 3C, acquisition of the image by each pixel band is performed during a third period of time $PT_3$.

According to some embodiments, and as shown in FIG. 3B, the third period of time $PT_3$ is totally within (or equal to) the second period of time $PT_2$ (e.g. $PT_3 \in PT_2$, or $PT_3 = PT_2$). In other words, image acquisition is performed only when actuator 160 is not moving sensor 130, that it to say only when sensor 130 has reached his new position and is retained stationary at this new position during period of time $PT_2$.

According to some embodiments, and as shown in FIG. 3C, at least a majority of the third period of time $PT_3$ is within the second period of time $PT_2$. In other words, most of the image acquisition is performed while the sensor 130 is fixed at its new position, and a minority of the image acquisition is performed while actuator 160 is moving sensor 130 (e.g. during period $PT_1$ located in time before period $PT_2$, and/or during period $PT_1$ located in time after period $PT_2$, that it to say when the method is repeated to make the sensor 130 join a second new position). This motion will not significantly affect the image quality since the velocity of the sensor during this short period of time is generally slow (since it corresponds to a period of time in which acceleration starts and/or to a period of time just before motion of the sensor ends).

According to some embodiments, and as shown in reference 220, operation 205 and 210 can be repeated, and in particular, a plurality of times.

Since acquisition of the images is performed while the camera has a static orientation towards a target, and while the sensor is static relative to the camera, smearing effect can be reduced and even cancelled. As a consequence, integration time (during which photons are collected by the sensor of the camera) can be increased, without blurring the image. In some embodiments, integration time has a magnitude of tens of seconds.

Figure 3D:
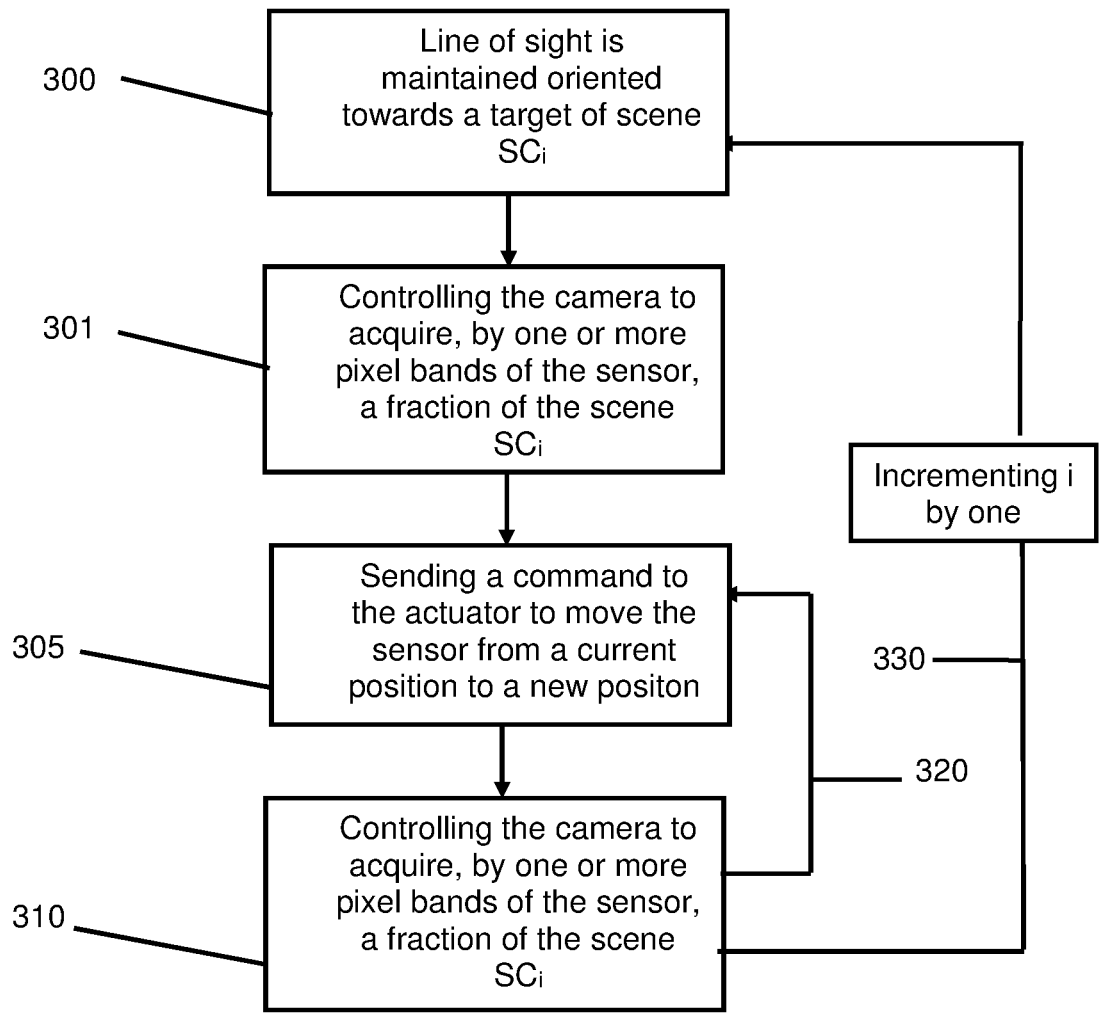
FIG. 3D illustrates an iterative method of acquiring images of a plurality of scenes.

Attention is now drawn to FIG. 3D which provides an iterative method of acquiring images of a plurality of scenes. Non-limitative illustrations of this iterative method are provided in FIGS. 3E to 3L.

An objective of the mission is to acquire a plurality of scenes, by each pixel band of the sensor. The scenes can comprise e.g. scenes located on Earth, which can be adjacent, or can be separated by a certain distance.

The method comprises (operation 300), while a line of sight of the camera is maintained (e.g. by the satellite, or using the various methods described beforehand) fixedly oriented towards a target of a current scene $SC_i$ (at the beginning of the mission, i=1), controlling the camera to acquire, by each of one or more pixel bands of the sensor located at a current position relative to the camera, an image of a fraction of scene SCi.

The method can comprise sending (operation 305) a command to the actuator to move the sensor relative to the camera along at least one direction, from a current position to a new position assigned to the sensor.

In some embodiments, the sensor includes a plurality of pixel bands each having a similar (or different) width, and the processing unit is configured to move the sensor relative to the camera along a distance substantially equal (or smaller) to this width.

Once the sensor has reached its new position, each pixel band can therefore acquire (operation 310) a new fraction of current scene $SC_i$. As mentioned above with respect to FIGS. 3A to 3C, acquisition of the image is performed (only or mainly) while the sensor is static relative to the camera.

In some cases, one or more of the pixel bands can acquire a fraction of the next scene $SC_{i+1}$ (for example if the next $SC_{i+1}$ is adjacent to the current scene $Sc_i$ and the sensor has already reached the border between the two scenes $SC_i/SC_{i+1}$). This is visible in the non-limitative example of FIG. 3K, in which the line of sight of the camera is oriented towards the first scene 385, and pixel band $350_1$ is already acquiring fraction $386_1$ of the next scene 386.

In some cases, although the line of sight is oriented towards current scene $SC_i$, one or more of the pixel bands can acquire a fraction of previous scene $SC_{i-1}$ (for example, if the camera is oriented towards a target of scene $SC_i$ which is located near the border between current scene $SC_i$ and past scene $SC_{i-1}$). This is visible in the non-limitative example of FIG. 3L, in which the line of sight is oriented towards a target $386_2$ of the second scene 386. In this position, pixel band $350_3$ is acquiring fraction $385_5$ of the previous scene 385.

The method can comprise repeating operations 305 and 310 while the line of sight of the camera is oriented towards scene $SC_i$ (see reference 320), so as to acquire, by each of the pixel bands of the sensor, most or all of scene $SC_i$.

After a period of time (depending e.g. on the velocity of the satellite or of the airborne, its trajectory or orbit, etc.) the line of sight of the camera is oriented towards a new scene $SC_{i+1}$.

This can be due to the fact that the scanning vehicle (e.g. satellite or airborne) is moving, and therefore, after a period of time, the line of sight will necessarily change its direction and point towards another portion of Earth. Therefore, the new scene $SC_{i+1}$ corresponds to the next scene of interest located on the route of the satellite or airborne.

This can be due also to the fact an orientation of the satellite or airborne is controlled so that the line of sight is oriented towards a new scene. For example, an agile satellite can be controlled so that the line of sight is oriented towards a new scene although this new scene is not located on the route of the satellite.

The method can include maintaining line of sight of the camera towards a target of the new scene $SC_{i+1}$ (operation 300, in which i has been incremented by one, as shown in reference 330).

While the camera is pointing fixedly towards this new scene $SC_{i+1}$, the method can comprise performing again operations 301, 305, 310 and 320.

In some embodiments, while the line of sight is switching from its past orientation towards scene $SC_i$ to its new orientation towards scene $SC_{i+1}$, the method can comprise moving back the sensor towards its original position (relative to the camera) at which it started for scene $SC_i$. This is however not mandatory. From this original position, the sensor can then acquire an image and be moved again relative to the camera, as explained in operations 301 and 305.

The method can be repeated for a plurality of scenes $SC_i$, until the requested scenes have been acquired.

In some embodiments, the method is repeated until each pixel band of the sensor of the camera gradually acquires an image of each a plurality of scenes $SC_i$ as a whole.

As a consequence, if each pixel band acquires images in a different spectral range, an image of each scene can be formed in each spectral range. This can be obtained by aggregating, e.g. by a processing unit, for each pixel band, each fraction that it has acquired from a given scene, thereby forming a full image of the given scene in the spectral range of this pixel band.

Figure 3E:
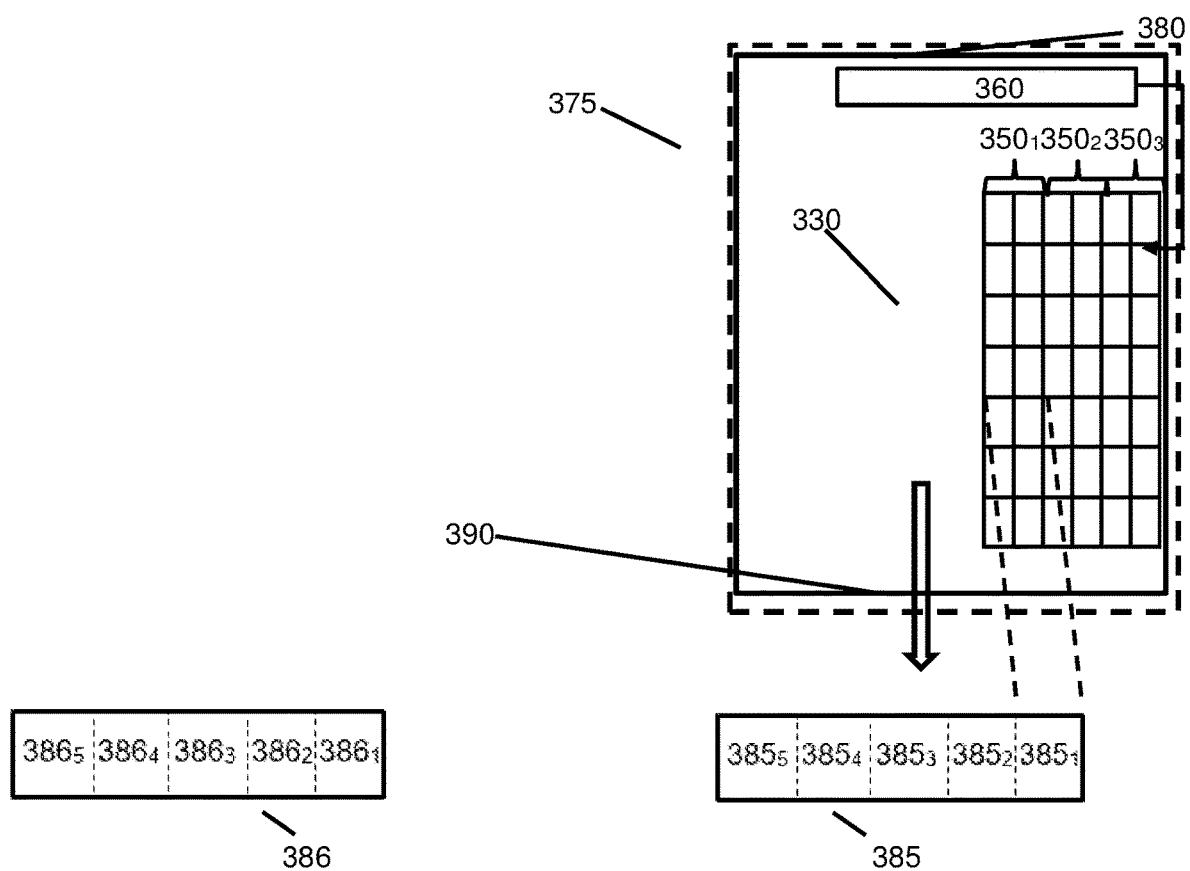
FIGS. 3E to 3M illustrate examples of acquiring images of a plurality of scenes, according to the method of FIG. 3D.

Attention is drawn to the example of FIG. 3E, which provides an example of the method of FIG. 3D, in the case of two scenes 385, 386. This is not limitative and the method applies to more than two scenes. The scenes are separated by a distance.

FIG. 3E depicts a sensor 330 (equivalent to sensor 130) of a camera 380. The camera can be mounted on a scanning vehicle or an imager (reference 375). A light of sight 390 the camera 380 is maintained oriented towards a fixed portion (target) of the first scene 385 on Earth. In this example, the line of sight 390 is fixedly oriented towards portion $385_3$ of the first scene 385. If the camera 380 is on a scanning vehicle, the line of sight of the camera 380 is maintained fixedly oriented during motion of the scanning vehicle (for a satellite, it follows an orbital motion around Earth). It will now be referred for this example to a satellite, but as mentioned, this is not limitative.

In its first position relative to the camera 380 (see FIG. 3E), sensor 330 acquires only a fraction of the scene 385. In particular, pixel band $350_1$ acquires only fraction $385_1$ of scene 385.

As explained in FIGS. 2 and 3D, a command can be sent to actuator 360, in order to translate position of sensor 330 relative to the camera 380 (and to the satellite or airborne 375) according to at least one direction. This corresponds to period of time $PT_1$ in FIG. 3A.

The direction which is selected to translate sensor 330 depends on the portion of the scene that needs to be observed. This direction can be, in some embodiments, parallel to the main direction of motion of the satellite or airborne, or in other embodiments, orthogonal to this main direction of motion. This is however not limitative, and in some embodiments, the direction of translation can be different from or uncorrelated to the direction of motion of the satellite or airborne.

According to some embodiments, while a line of sight of the camera is maintained fixedly oriented towards a target of a scene, a direction of a motion of the sensor 330 relative to the camera is not opposite to a direction of a motion of the scanning vehicle (e.g. satellite 375).

Figure 3F:
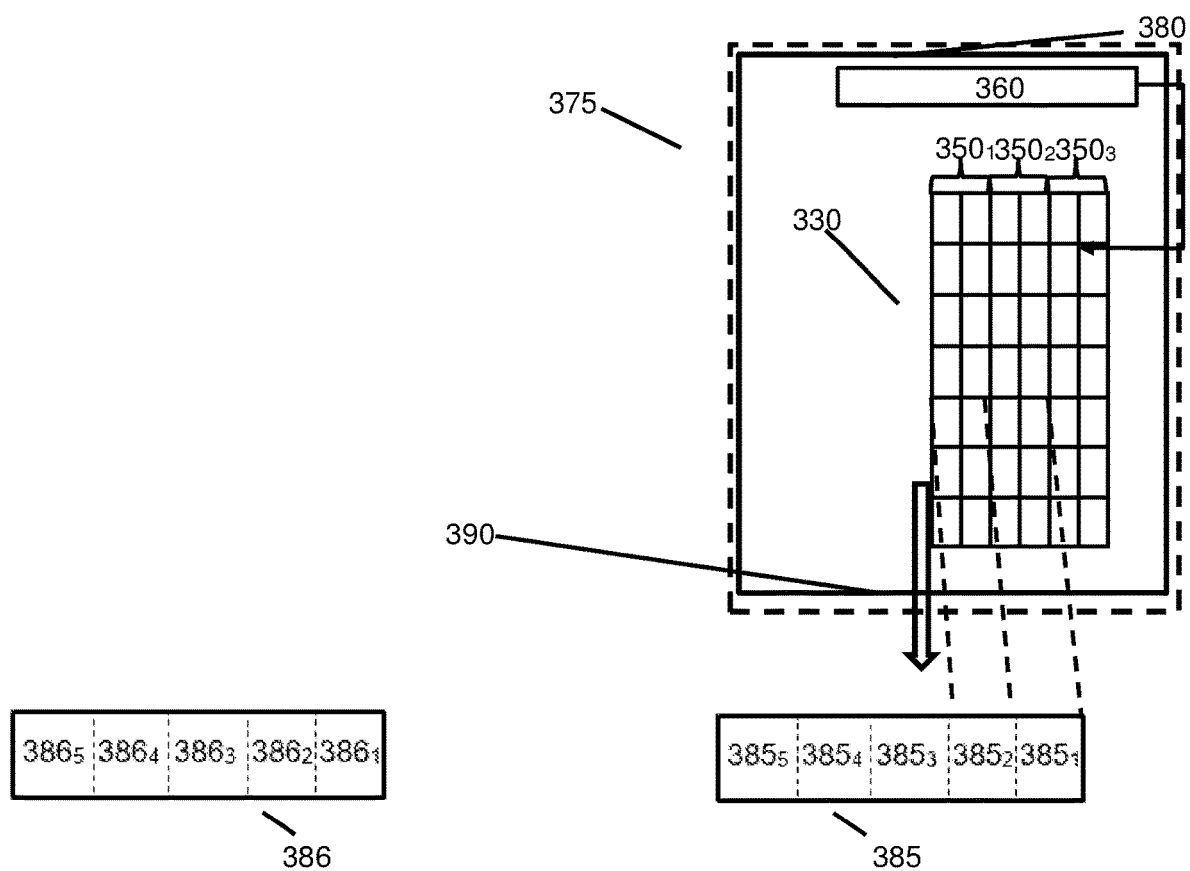

Once the sensor 330 has reached its new position shown in FIG. 3F (motion of the sensor 330 corresponds to period of time $PT_1$ in FIG. 3A), a command can be sent to the camera 380 to acquire again an image of the scene. Image acquisition corresponds to period of time $PT_3$ in FIG. 3B or 3C. As mentioned above, according to some embodiments (see FIG. 3B), image acquisition is performed only if the sensor 330 has reached its new position and is now static relative to the camera 380.

Since a translation of the sensor 330 has been performed, sensor 330 can now acquire another fraction of the scene 385.

In particular, (see FIG. 3F):
pixel band $350_1$ acquires now only fraction $385_2$ of scene 385; and
pixel band $350_2$ acquires now only fraction $385_1$ of scene 485.

Figure 3G:
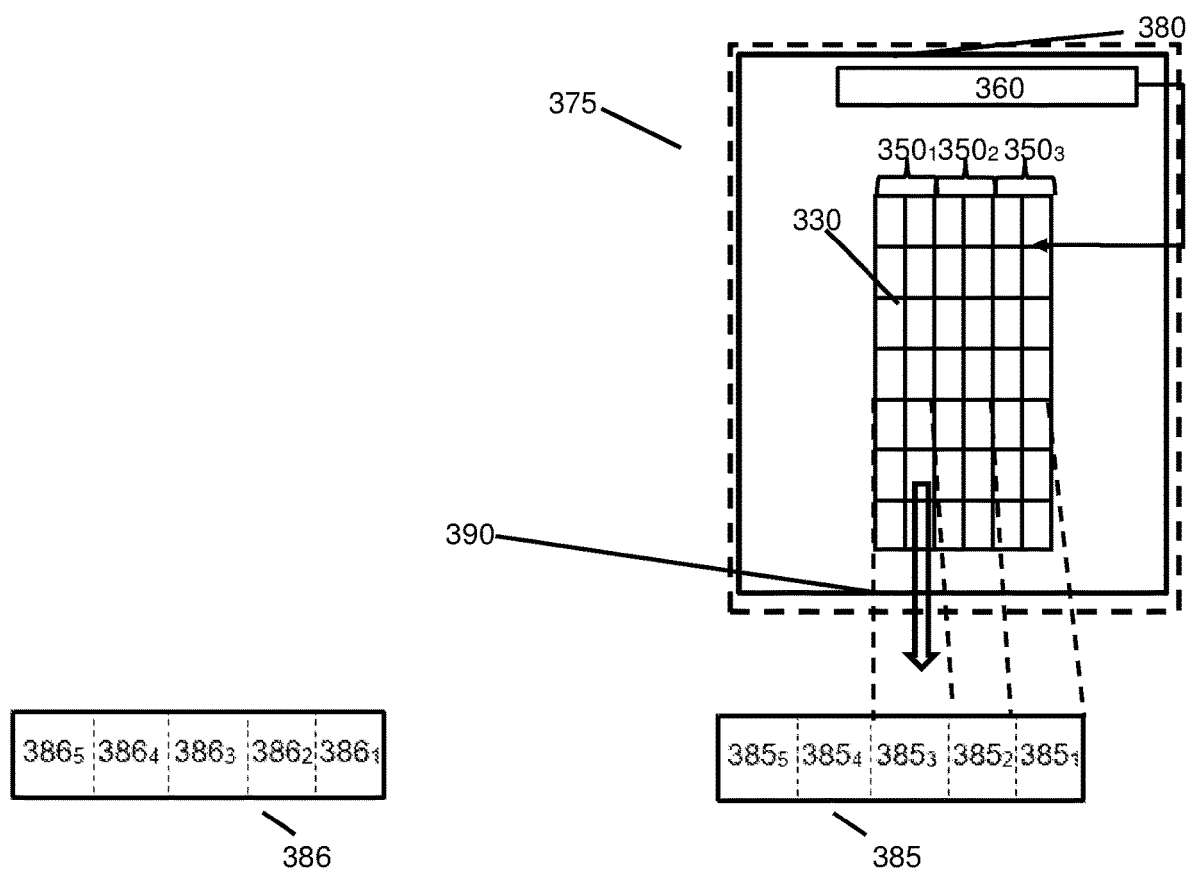

This process can be repeated again. As shown in FIG. 3G, another translation of sensor 330 relative to vehicle 380 can be performed. Therefore:
pixel band $350_1$ acquires now only fraction $385_3$ of scene 385;
pixel band $350_2$ acquires now only fraction $385_2$ of scene 385; and
pixel band $350_3$ acquires now only fraction $385_1$ of scene 385.

This process can be repeated again, until each pixel band of the sensor has acquired each fraction $385_1$ to $385_5$ of the scene 385. The last position of the sensor relative to the camera for acquiring this scene 385 is shown in FIG. 3H.

During the period of time corresponding to FIGS. 3E to 3H, the line of sight of the camera was oriented towards portion $385_3$ of the first scene 385 (e.g. while the satellite or airborne 375 was in motion).

Figure 3H:
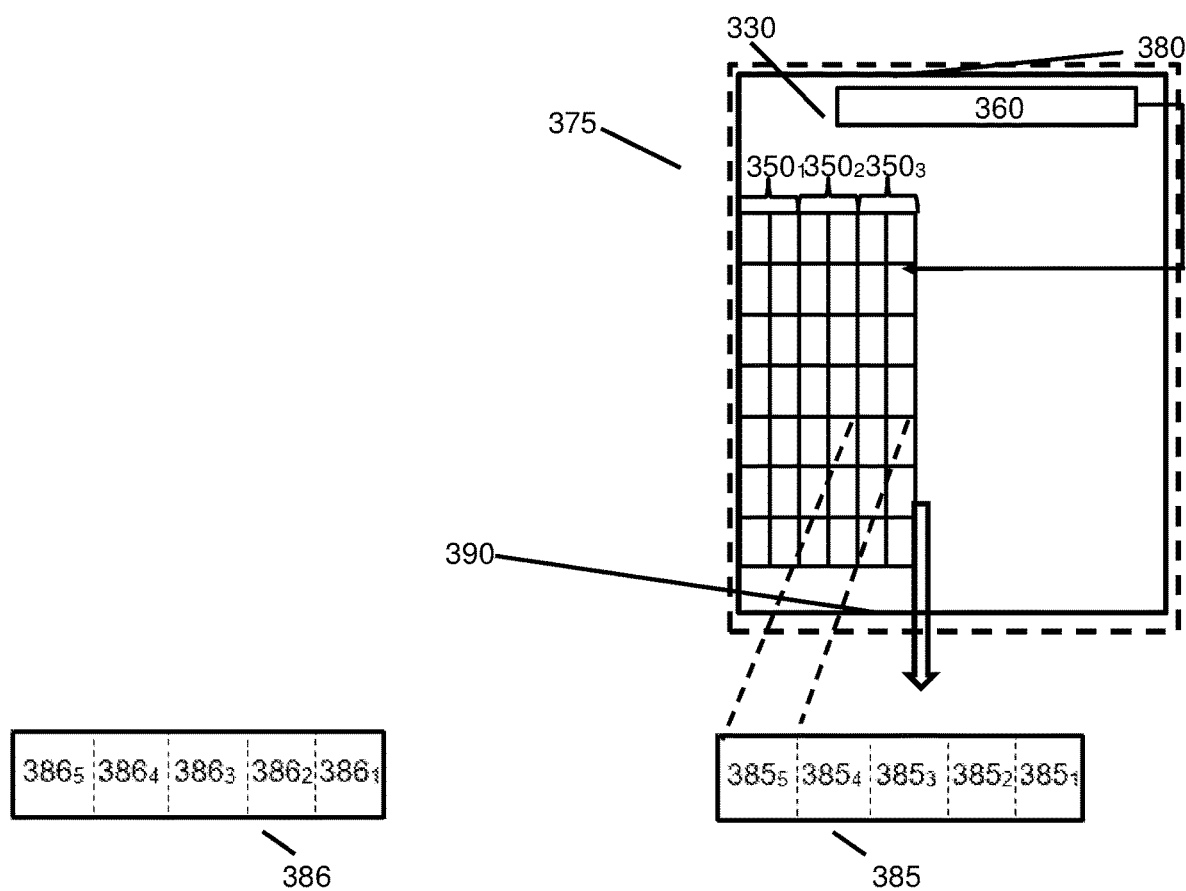
Figure 3I:
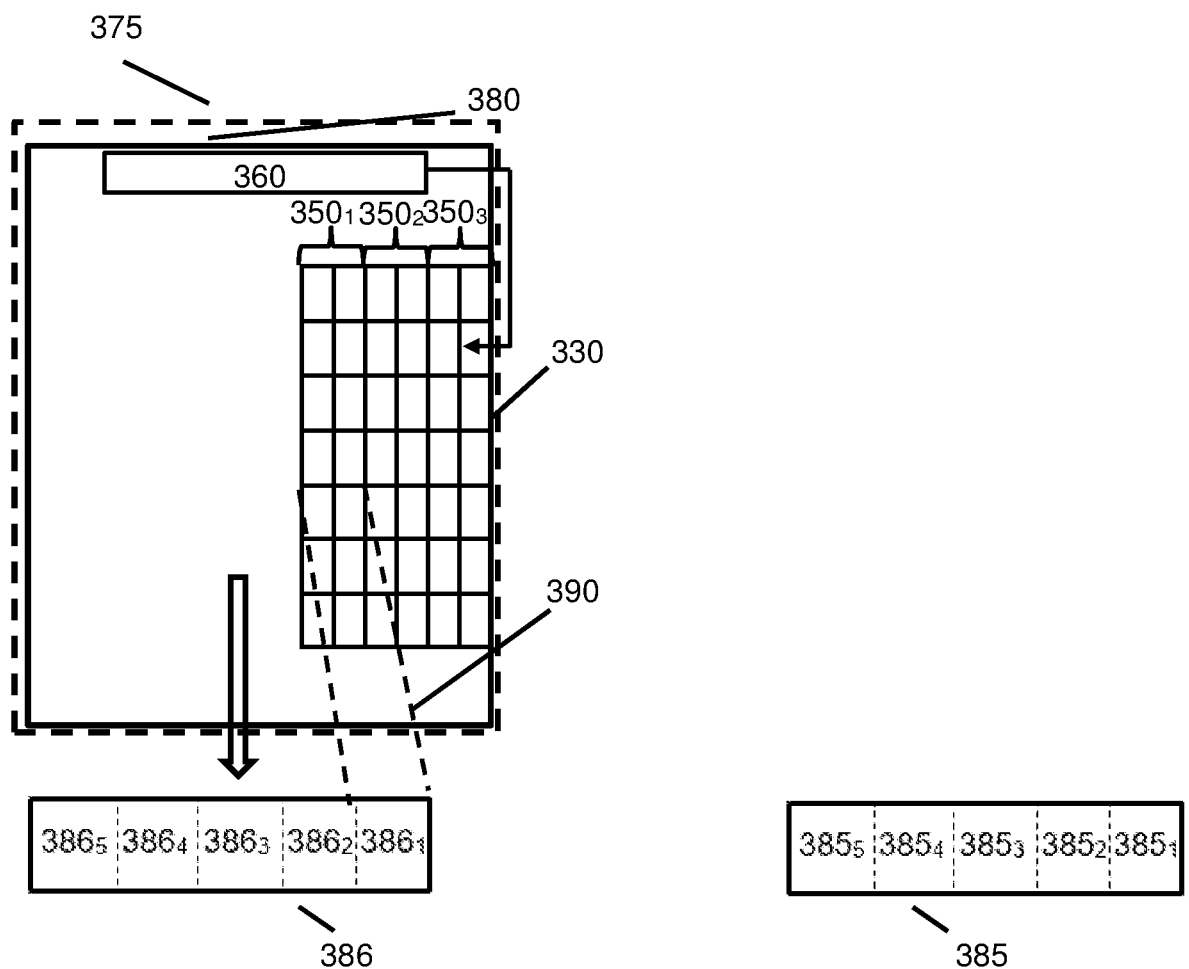

In the time period between FIGS. 3H and 3I, the orientation of the line of sight 390 changes (e.g. due to motion of satellite or airborne 375, and/or due to a modification of an orientation of the satellite or airborne). According to some embodiments, during this time period, the sensor can be moved back to its original position relative to the camera (its original position corresponds to FIG. 3E).

Figure 3J:
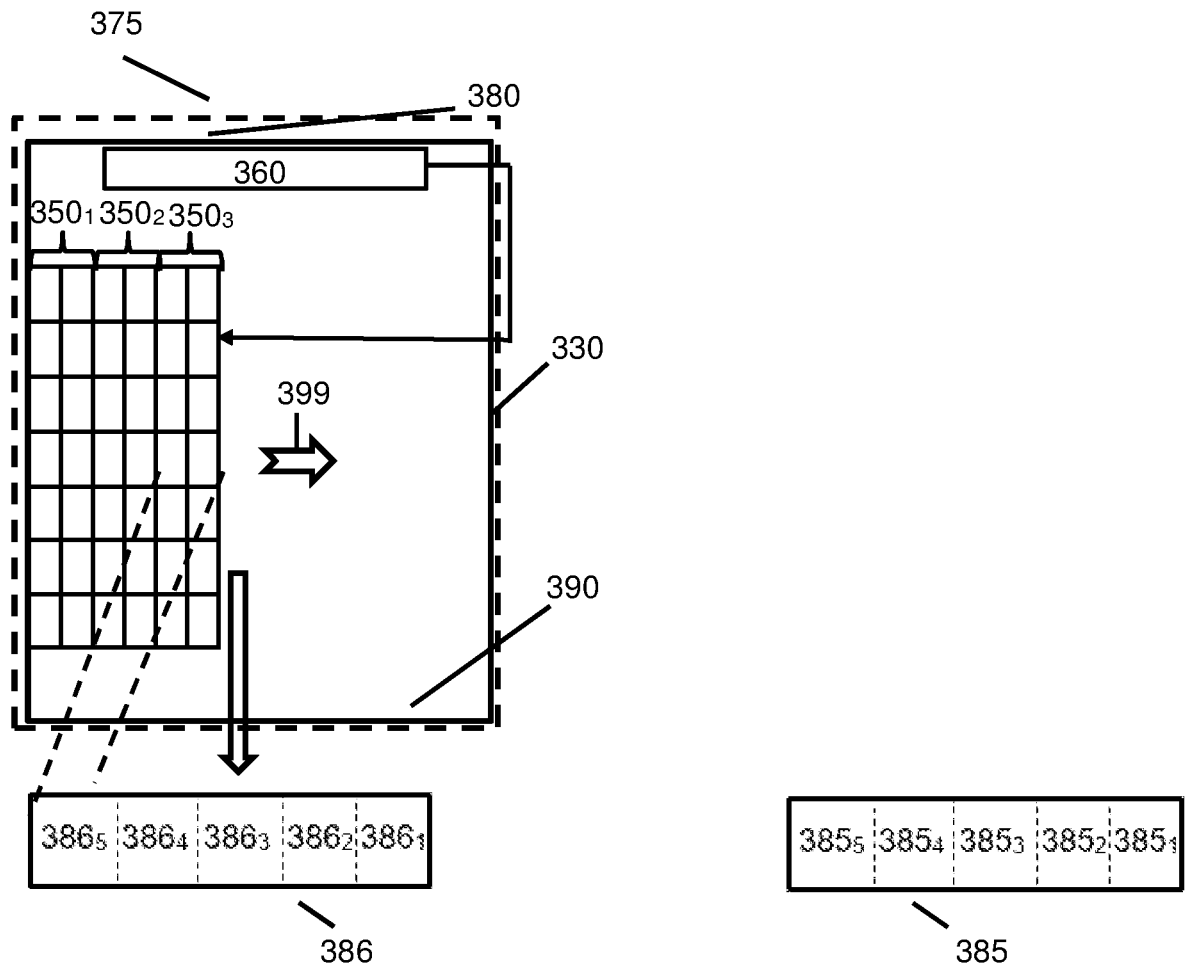

Alternatively, it is possible to maintain the sensor 330 at its last position relative to the camera (as illustrated in FIG. 3J), and therefore, pixel band $350_3$ will acquire fraction $386_5$ of the second scene 386. The other fractions of the scene 386 can be acquired by each pixel band by moving the sensor 330 relative to the camera in a direction 399 opposite to the direction used for the first scene.

As visible in FIG. 3I, line of sight 390 of camera 380 is oriented towards portion $386_3$ of the second scene 386.

In FIG. 3I, pixel band $350_1$ acquires now only fraction $386_1$ of scene 386.

The process which was performed for the first scene 385 (as depicted is FIGS. 3E to 3H) is now repeated similarly for the second scene 386.

As a consequence, each pixel band $350_1$ to $350_3$ of the sensor 350 acquires each fraction $386_1$ to $386_5$ of the second scene 386.

Figure 3K:
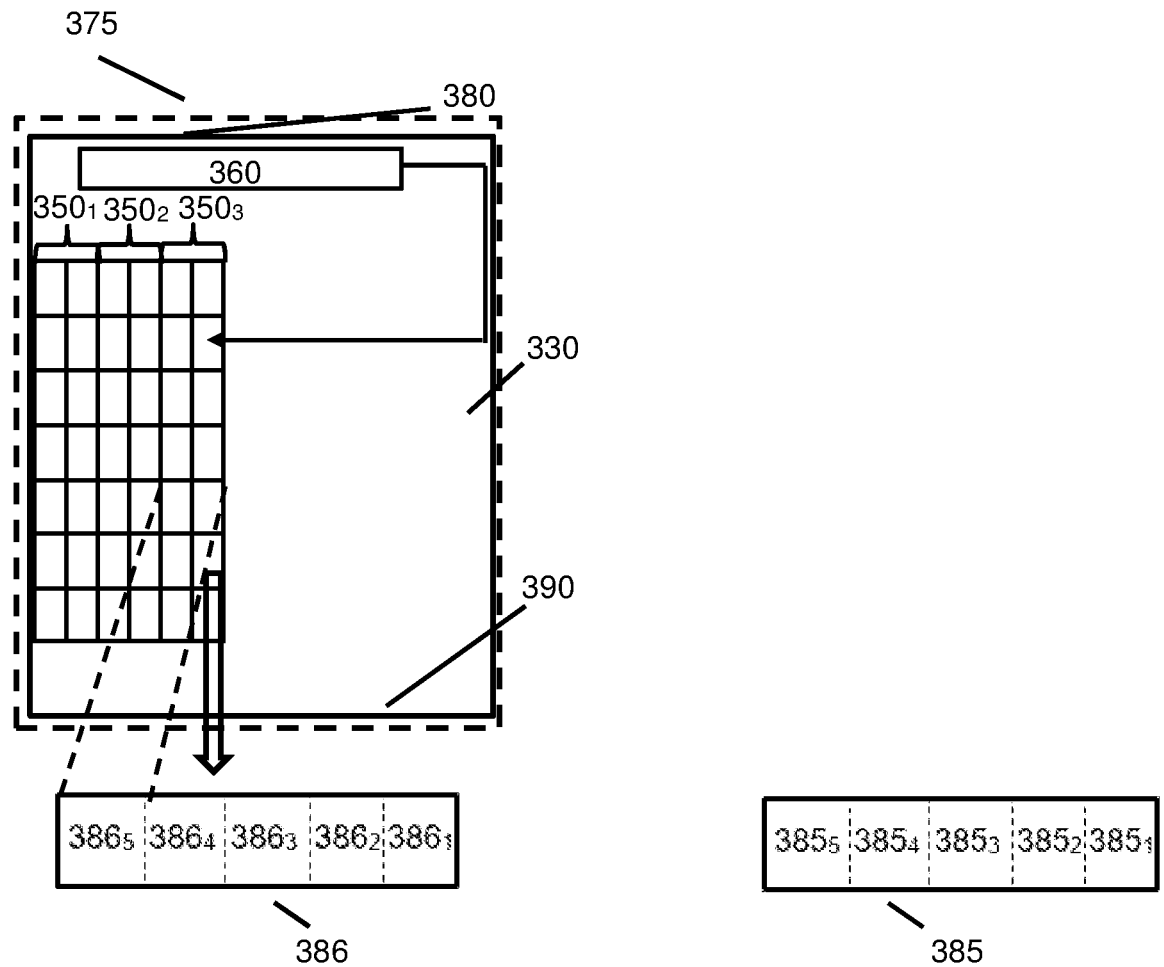

The last position of the sensor 350 relative of the camera for the second scene 386 is illustrated in FIG. 3K (in case acquisition of the second scene 386 has started as depicted in FIG. 3I).

By inducing a relative motion of the sensor 330 with respect to the camera 380, while the camera has a fixed line of sight, acquisition of different fractions of the scene by each of the pixel bands $350_1$ to $350_3$ of the sensor 330 is obtained, which could not be acquired without this relative motion.

In addition, according to some embodiments, since most of (or all of) image acquisition is performed during a period of time in which the sensor is fixed relative to the camera and to the scene (and to the airborne or satellite, if the camera is fixed relative to the airborne or satellite), smearing effect is reduced, or even cancelled.

A possible application of the method described above can include acquiring image of a scene in different spectral ranges.

Assume that each pixel band $350_1$ to $350_3$ is configured to acquire an image in a different spectral range, respectively $[\lambda_1], [\lambda_2], [\lambda_3]$.

With the process described above, each fraction of the scene(s) will be acquired in each of these spectral ranges. Therefore, a full image of the scene(s) can be obtained (by aggregating the different images acquired by each pixel band) in each of these spectral ranges.

Figure 3L:
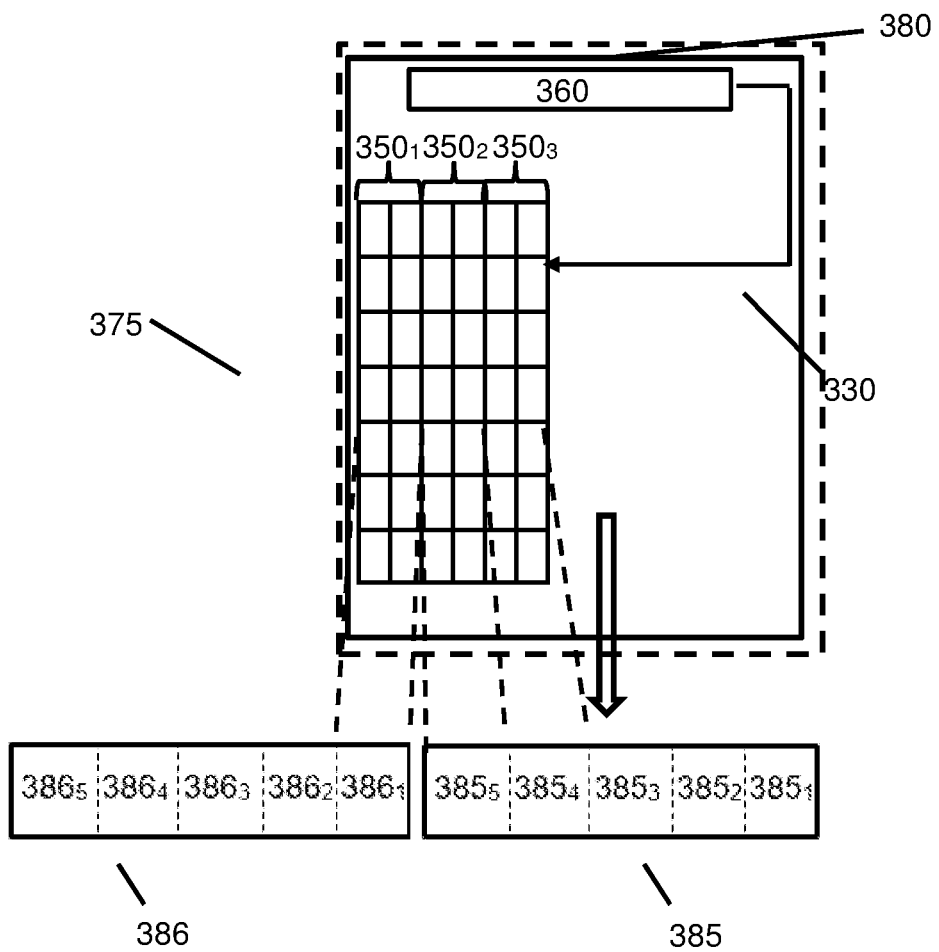

Attention is now drawn to FIG. 3L. In some embodiments, and as depicted in FIG. 3L, the two scenes 385, 386 can be adjacent, or close one to the other. Therefore, when implementing the method of FIG. 3D, it can appear at some stage that although the line of sight of the camera is oriented towards a fixed target of the first scene 385, one or more pixel bands (in this example pixel band $350_1$) of the sensor is already acquiring a fraction of the second scene 386.

Figure 3M:
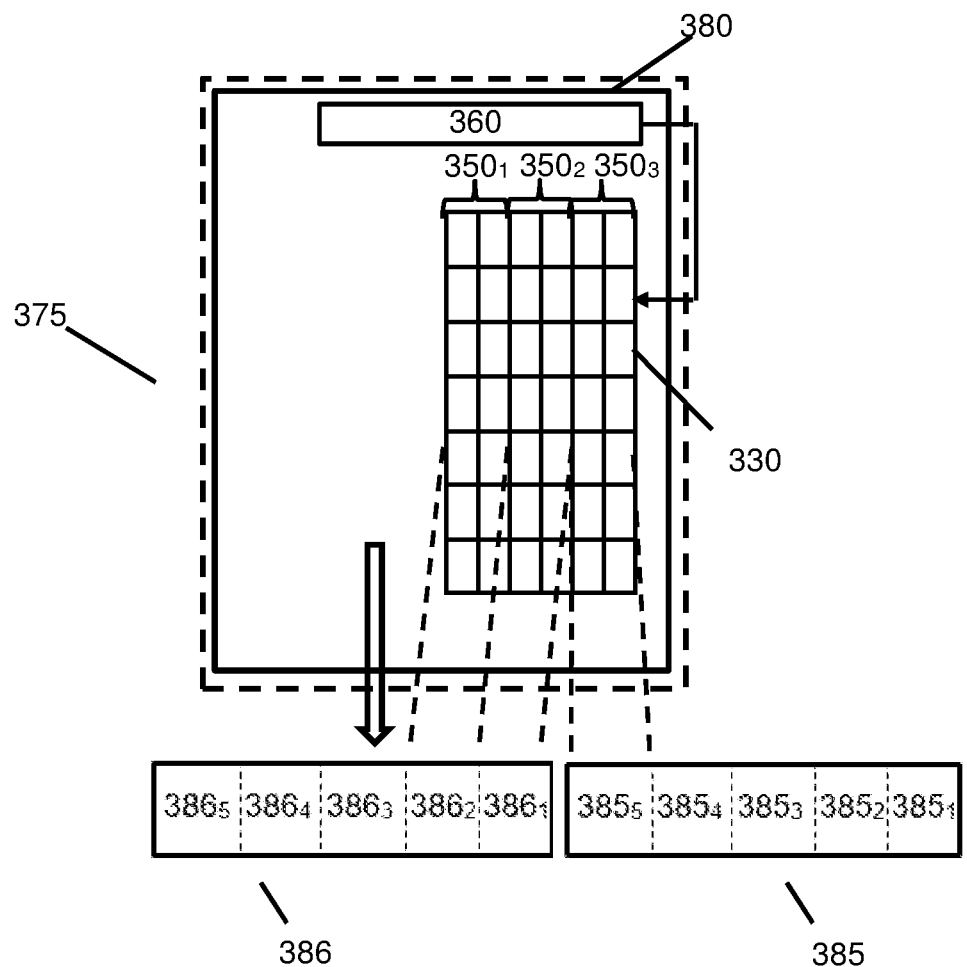

Attention is now drawn to FIG. 3M. In some embodiments, and as depicted in FIG. 3M, the two scenes 385, 386 can be adjacent, or close one to the other. Therefore, when implementing the method of FIG. 3D, it can appear at some stage that although the line of sight of the camera is oriented towards a fixed target of the second scene 386, one or more pixel bands (in this example pixel band $350_3$) of the sensor are still acquiring a fraction of the first scene 385.

Figure 4:
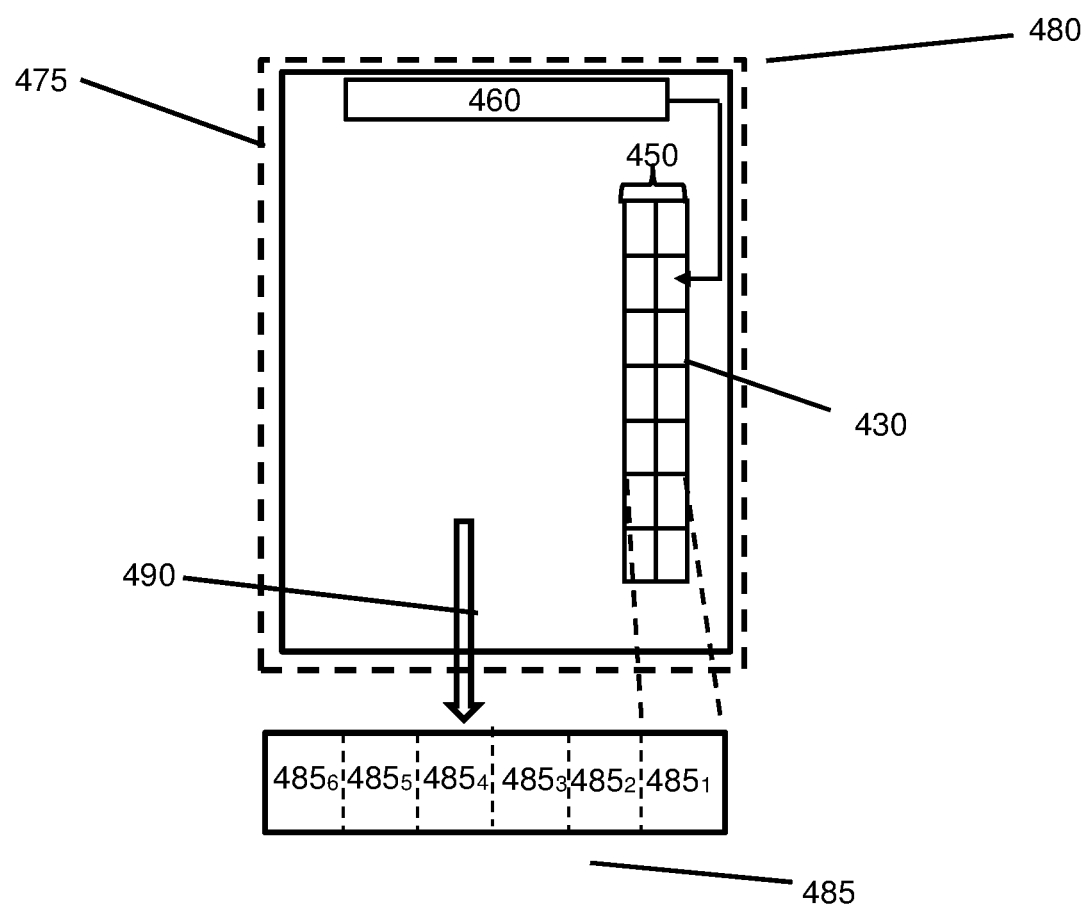
FIGS. 4 to 4B illustrate an example of acquiring images of a scene, using the system of FIG. 1A.

Another application of the methods described beforehand is illustrated in FIG. 4.

As shown, a sensor 430 (equivalent to sensor 130) of a camera 480 is mounted on platform 475 which can be a scanning vehicle (e.g. satellite or airborne) or a scanning imager on ground. A light of sight (LOS) 490 of the camera 480 is maintained oriented towards a fixed portion (target) of the first scene 485 on Earth, using the various methods described above. In this example, the line of sight 490 is oriented towards portion $485_4$ of a scene 485.

In this example, the sensor 430 comprises a single pixel band 450 (this is however not limitative). The pixel band 450 has a field of view which is smaller than the scene 485 to be acquired, and therefore, acquires only a fraction (at this period of time, fraction $485_1$) of the scene 485.

In order to acquire the whole scene 485, a command can be sent to actuator 460, in order to translate position of sensor 430 relative to the camera 480 (and to the airborne or satellite 475) according to at least one direction.

Figure 4A:
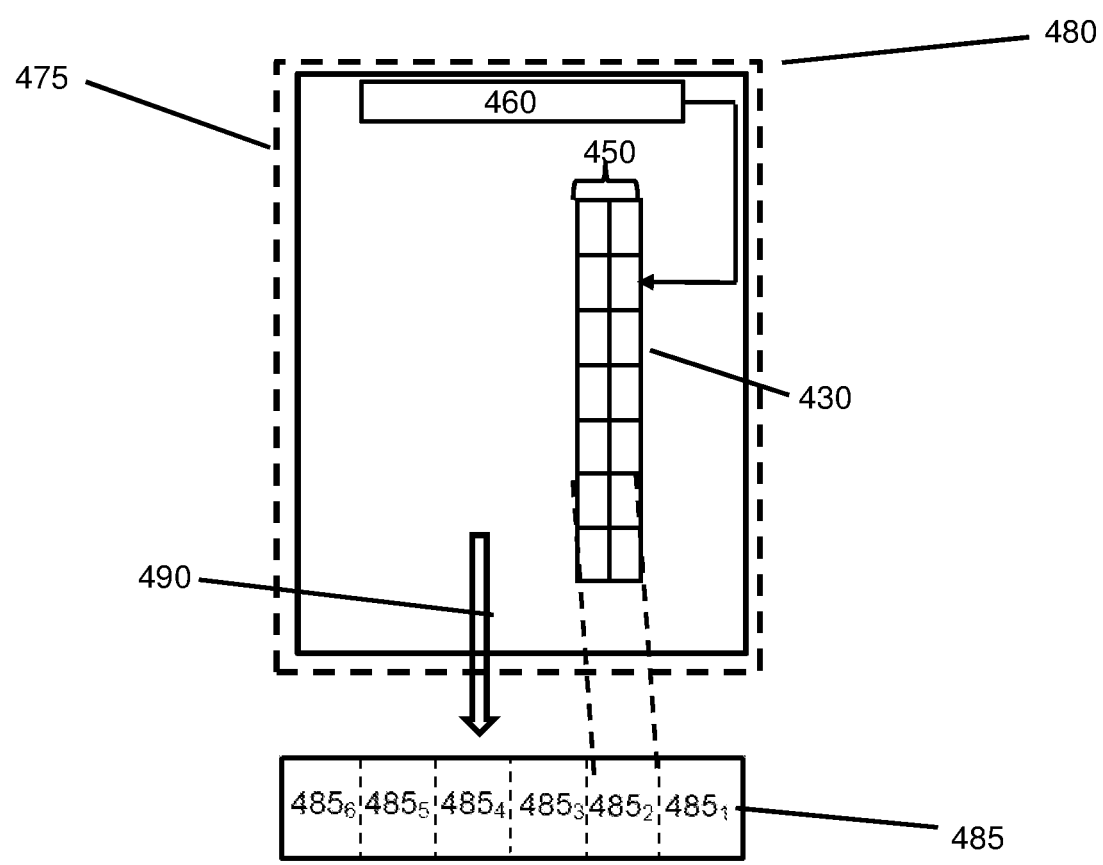

Once the sensor 430 has reached its new position (see FIG. 4A), a command can be sent to the camera 480 to acquire again an image of the scene. Image acquisition corresponds to period of time $PT_3$ in FIG. 3B or 3C. As mentioned above, according to some embodiments (see FIG. 3B), image acquisition is performed only if the sensor 430 has reached its new position and is now static relative to the camera 480.

Since a translation of the sensor 430 has been performed, sensor 430 can now acquire another fraction $485_2$ of the scene 485.

Figure 4B:
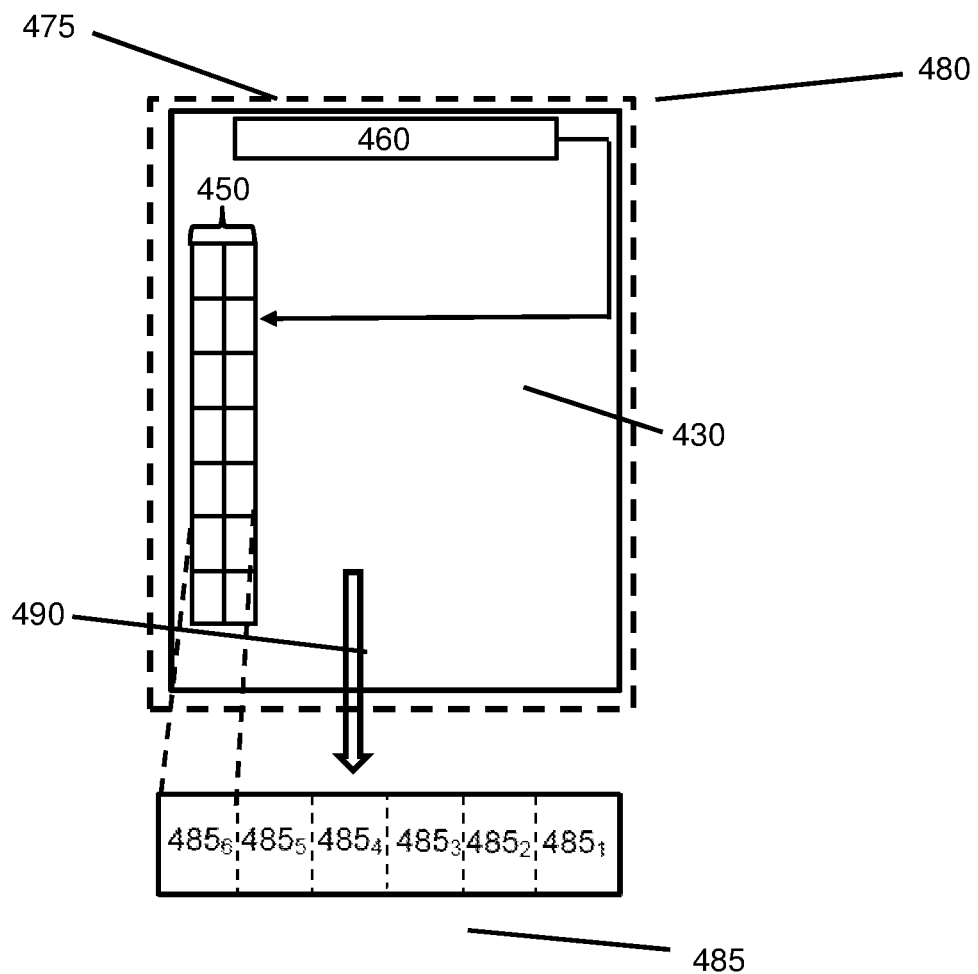

This process can be repeated, until the whole scene 485 is acquired by the sensor 430. The last position of the sensor 430 is illustrated in FIG. 4B, in which the sensor 430 acquires the last portion $485_6$ of the scene 485.

Over time, line of sight 490 will be oriented towards a target of another scene, which can be acquired similarly by sensor 430.

As mentioned above, smearing can be reduced and even cancelled, since sensor 430 acquires an image only when the camera is oriented towards a fixed target of a scene, and when the sensor 430 is fixed (after its translation) relative to the camera.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An imaging system comprising:
    at least one camera, comprising at least one sensor comprising one or more pixel bands each configured to acquire an image of a fraction of a scene, wherein the sensor is movable, by at least one actuator, relative to the camera along at least one direction,
    a processor and memory circuitry configured to,
        while a line of sight of the camera is maintained fixedly oriented towards a target of a scene:
            ($O_1$) control the camera to acquire an image by each of the pixel bands of the sensor located at a current position relative to the camera,
            ($O_2$) send a command to the actuator to move the sensor relative to the camera along the at least one direction, from the current position to a new position, and
            ($O_3$) control the camera to acquire an image by each of the pixel bands of the sensor,
        wherein motion of the sensor at $O_2$ from the current position to the new position is performed during a period of time $PT_1$, and the sensor is retained stationary at the new position during a period of time $PT_2$,
        wherein acquisition of the image by each of the pixel bands of the sensor at $O_3$ is performed during period of time $PT_3$, wherein at least a majority of the period of time $PT_3$ is within the period of time $PT_2$.

2. The imaging system of claim 1, configured to be mounted on an airborne or a satellite, wherein the line of sight of the camera is maintained fixedly oriented towards the target of the scene during motion of the airborne or satellite.

3. The imaging system of claim 1, configured to be part of a ground imager.

4. The imaging system of claim 1, wherein all of the period of time $PT_3$ is within the period of time $PT_2$.

5. The imaging system of claim 1, wherein the processor and memory circuitry is configured to repeat ($O_2$) and ($O_3$) a plurality of times, until acquisition of at least part of the scene, or of the whole scene, by each of the pixel bands, is obtained.

6. The imaging system of claim 1, wherein the processor and memory circuitry is configured to, for a plurality of different scenes $SC_1$ to $SC_N$, with N>1, repetitively perform, from I equal to 1 up to I equal to N:
    ($O_{0,I}$) while a line of sight of the camera is maintained fixedly oriented towards a target of a scene $SC_i$:
        ($O_{1,I}$) control the camera to acquire, by each of one or more pixel bands of the sensor located at a current position relative to the camera, an image of a fraction of scene $SC_i$,
        ($O_{2,I}$) send a command to the actuator to move the sensor relative to the camera along the at least one direction, from the current position to a new position, and
        ($O_{3,I}$) control the camera to acquire, by each of one or more pixel bands of the sensor located at the new position relative to the camera, an image of a fraction of at least scene $SG_i$,
    wherein motion of the sensor at $O_{2,I}$ from the current position to the new position is performed during a first period of time $PT_{1,I}$, and the sensor is retained stationary at the new position during a second period of time $PT_{2,I}$, wherein acquisition of the image at $O_{3,I}$ is performed during a third period of time $PT_{3,I}$, wherein at least a majority of the third period of time $PT_{3,I}$ is within the second period of time $PT_{2,I}$,
    ($O_{3,i}$) revert to operation $O_{2,I}$,
    wherein, after a period of time, I is incremented by one and it is reverted to operation $O_{0,i}$.

7. The imaging system of claim 6, wherein an orientation of the line of sight toward a target of scene $SC_i$ is changeable to an orientation toward a target of scene $SC_{i+1}$ by performing a manoeuvre of a vehicle on which the imaging system is mounted.

8. The imaging system of claim 6, wherein:
    each of the pixel bands is configured to acquire images in a different spectral range; and
    the camera is controlled so that each pixel band of the camera gradually acquires an image of each of a plurality of the scenes SG as a whole in its spectral range, thereby providing an image of each of the plurality of the scenes $SC_i$ in its spectral range.

9. The imaging system of claim 1, wherein the sensor is a two dimensional sensor comprising a plurality of pixel bands.

10. The imaging system of claim 1, wherein while a line of sight of the camera is maintained fixedly oriented towards a target of a scene, a direction of motion of the sensor from the current position to the new position is not opposite to a direction of motion of a vehicle on which the imaging system is mounted.

11. The imaging system of claim 1, wherein the sensor comprises a plurality of pixel bands having a similar width, wherein the processor and memory circuitry is configured to induce motion of the sensor relative to the camera along a distance substantially equal to the width, or smaller than the width.

12. An imaging method comprising:
    providing at least one camera, wherein the camera comprises at least one sensor comprising one or more pixel bands each configured to acquire an image of a fraction of a scene,
    while a line of sight of the camera is maintained fixedly oriented towards a target of a scene:
        ($O_1$) controlling the camera to acquire an image by each of the pixel bands of the sensor located at a current position relative to the camera,
        ($O_2$) sending a command to an actuator of the sensor, for inducing a motion of the sensor relative to the camera along at least one direction, from the current position to a new position,
        ($O_3$) controlling the camera to acquire an image by each of the pixel bands of the sensor,
    wherein motion of the sensor from the current position to the new position is performed during a first period of time $PT_1$, and the sensor is retained stationary at the new position during a second period of time $PT_2$,
    wherein acquisition of the image by each of the pixel bands of the sensor is performed during a third period of time $PT_3$, wherein at least a majority of the third period of time $PT_3$ is within the second period of time $PT_2$.

13. The imaging method of claim 12, wherein at least one of (i) or (ii) is met:
    the camera is mounted on an airborne or a satellite, wherein the line of sight of the camera is maintained fixedly oriented towards the target of the scene during motion of the airborne or satellite, or the camera is part of a scanning imager including a basement which orientation is controllable to modify an orientation of the line of sight of the camera.

14. The imaging method of claim 12, wherein all of the third period of time $PT_3$ is within the second period of time $PT_2$.

15. The imaging method of claim 12, comprising repeating ($O_2$) and ($O_3$) a plurality of times, until acquisition of at least part of the scene, or of the whole scene, by each of the pixel bands, is obtained.

16. The imaging method of claim 12, comprising, for a plurality of different scenes $SC_1$ to $SC_N$, with N>1, repetitively performing, from i equal to 1 up to i equal to N:

($O_{0,i}$) while a line of sight of the camera is maintained fixedly oriented towards a scene $SC_i$:

($O_{1,i}$) controlling the camera to acquire, by each of one or more pixel bands of the sensor located at a current position relative to the camera, an image of a fraction of scene $SC_i$, ($O_{2,i}$) sending a command to the actuator to move the sensor relative to the camera along the at least one direction, from the current position to a new position, and ($O_{3,i}$) controlling the camera to acquire, by each of one or more pixel bands of the sensor located at the new position relative to the camera, an image of a fraction of at least scene $SC_i$, wherein motion of the sensor at $O_{2,i}$ from the current position to the new position is performed during a first period of time $PT_{1,i}$, and the sensor is retained stationary at the new position during a second period of time $PT_{2,i}$, wherein acquisition of the image at $O_{3,i}$ is performed during a third period of time $PT_{3,i}$, wherein at least a majority of the third period of time $PT_{3,i}$ is within the second period of time $PT_{2,i}$, ($O_{3,i}$) reverting to operation $O_{2,i}$, wherein, after a period of time, i is incremented by one and it is reverted to operation $O_{0,i}$.

17. The imaging method of claim 16, comprising at least one of (i) or (ii):

(i) the method comprises changing orientation of the line of sight toward a target of scene $SC_i$ to an orientation toward a target of scene $SC_{i+1}$ by performing a manoeuvre of a vehicle on which the camera is mounted, or (ii) each of the pixel bands is configured to acquire images in a different spectral range, and the camera is controlled so that each pixel band of the camera gradually acquires an image of each of a plurality of the scenes SG as a whole in its spectral range, thereby providing an image of each of the plurality of the scenes $SC_i$ in its spectral range.

18. The imaging method of claim 12, wherein while a line of sight of the camera is maintained fixedly oriented towards a target of a scene, a direction of motion of the sensor from the current position to the new position is not opposite to a direction of motion of a vehicle on which the camera is mounted.

19. The imaging method of claim 12, wherein the sensor comprises a plurality of pixel bands having a similar width, wherein the method comprises moving the sensor relative to the camera along a distance substantially equal to the width, or smaller than the width.

20. A non-transitory computer readable medium comprising instructions that, when executed by a processor and memory circuitry, cause the processor and memory circuitry to perform operations comprising:

while a line of sight of a camera is maintained fixedly oriented towards a target of a scene, wherein the camera comprises at least one sensor comprising one or more pixel bands, ($O_1$) controlling the camera to acquire an image by each of the pixel bands of the sensor located at a current position relative to the camera, ($O_2$) sending a command to an actuator of the sensor, for inducing a motion of the sensor relative to the camera along at least one direction, from the current position to a new position, ($O_3$) controlling the camera to acquire an image by each of the pixel bands of the sensor, wherein motion of the sensor from the current position to the new position is performed during a first period of time $PT_1$, and the sensor is retained stationary at the new position during a second period of time $PT_1$, wherein acquisition of the image by each of the pixel bands of the sensor is performed during a third period of time $PT_3$, wherein at least a majority of the third period of time $PT_3$ is within the second period of time $PT_2$.

* * * * *